United States Patent
Osawa et al.

(10) Patent No.: US 9,582,241 B2
(45) Date of Patent: Feb. 28, 2017

(54) CONTROL APPARATUS AND CONTROL METHOD THEREOF

(75) Inventors: Seiji Osawa, Aiko-gun (JP); Sosuke Kagaya, Ebina (JP)

(73) Assignee: Canon Kabushiki Kaisha, Tokyo (JP)

(*) Notice: Subject to any disclaimer, the term of this patent is extended or adjusted under 35 U.S.C. 154(b) by 310 days.

(21) Appl. No.: 13/542,166

(22) Filed: Jul. 5, 2012

(65) Prior Publication Data
US 2013/0021383 A1    Jan. 24, 2013

(30) Foreign Application Priority Data

Jul. 19, 2011  (JP) ................. 2011-158047

(51) Int. Cl.
| | | |
|---|---|---|
| G09G 3/34 | (2006.01) | |
| G06F 3/147 | (2006.01) | |
| G09G 5/00 | (2006.01) | |
| G09G 5/39 | (2006.01) | |
| G06F 3/0484 | (2013.01) | |
| G09G 3/36 | (2006.01) | |

(52) U.S. Cl.
CPC ............. *G06F 3/147* (2013.01); *G09G 5/003* (2013.01); *G09G 5/39* (2013.01); *G09G 2320/066* (2013.01); *G09G 2340/045* (2013.01); *G09G 2370/04* (2013.01)

(58) Field of Classification Search
CPC .............. G09G 2320/0646; G09G 2320/066; G09G 2340/045; G09G 2340/04; G09G 2340/16; G09G 2360/16; G09G 2310/0237; G09G 5/003; G09G 5/39; G09G 2370/04; G06F 3/147
USPC ......... 345/102; 715/800, 815, 798, 788, 252
See application file for complete search history.

(56) References Cited

U.S. PATENT DOCUMENTS

| | | | | |
|---|---|---|---|---|
| 6,972,771 | B2* | 12/2005 | Nakano et al. | 345/589 |
| 8,363,003 | B2* | 1/2013 | Kwon | G09G 3/3406 345/102 |
| 8,890,794 | B2* | 11/2014 | Kim | G09G 3/3406 345/102 |
| 8,984,438 | B2* | 3/2015 | Ernst | G06F 17/3028 382/302 |
| 9,124,858 | B2* | 9/2015 | Jang | G09G 5/006 |
| 2003/0048354 | A1* | 3/2003 | Takemoto | H04N 13/0048 348/51 |
| 2005/0248592 | A1* | 11/2005 | Feng et al. | 345/690 |
| 2006/0038770 | A1* | 2/2006 | Burkholder | 345/102 |

(Continued)

FOREIGN PATENT DOCUMENTS

| | | | | |
|---|---|---|---|---|
| JP | 07334665 A | * | 12/1995 | G06T 3/40 |
| JP | 2005-258403 | | 9/2005 | |
| JP | 2009-265671 | | 11/2009 | |

*Primary Examiner* — Julie Anne Watko
(74) *Attorney, Agent, or Firm* — Cowan, Liebowitz & Latman, P.C.

(57) ABSTRACT

A control apparatus, according to the present invention, for controlling a display apparatus having a liquid crystal panel and a backlight which is configured from a plurality of divided regions and which emits light, with one or more divided regions as one light-emitting unit, based on decided emission brightness of each light-emitting unit, comprises a control unit that sets, upon displaying a second image formed by enlarging a first image, a size of the light-emitting unit larger in comparison to a case of displaying the first image according to an enlargement ratio of the second image relative to the first image.

10 Claims, 24 Drawing Sheets

(56) References Cited

U.S. PATENT DOCUMENTS

| | | | |
|---|---|---|---|
| 2006/0101293 A1* | 5/2006 | Chandley et al. | 713/300 |
| 2006/0103621 A1* | 5/2006 | Feng | 345/102 |
| 2006/0202945 A1* | 9/2006 | Feng | 345/102 |
| 2007/0216311 A1* | 9/2007 | Cernasov et al. | 315/3 |
| 2007/0222801 A1* | 9/2007 | Whitehead | 345/697 |
| 2007/0268240 A1* | 11/2007 | Lee et al. | 345/102 |
| 2007/0268461 A1* | 11/2007 | Whitehead | 353/53 |
| 2009/0040246 A1* | 2/2009 | Miyasaka | 345/698 |
| 2011/0227940 A1* | 9/2011 | Neal | 345/589 |
| 2015/0269894 A1* | 9/2015 | Shin | G09G 3/3426 345/690 |
| 2015/0348469 A1* | 12/2015 | Otoi | G09G 3/3426 345/690 |

* cited by examiner

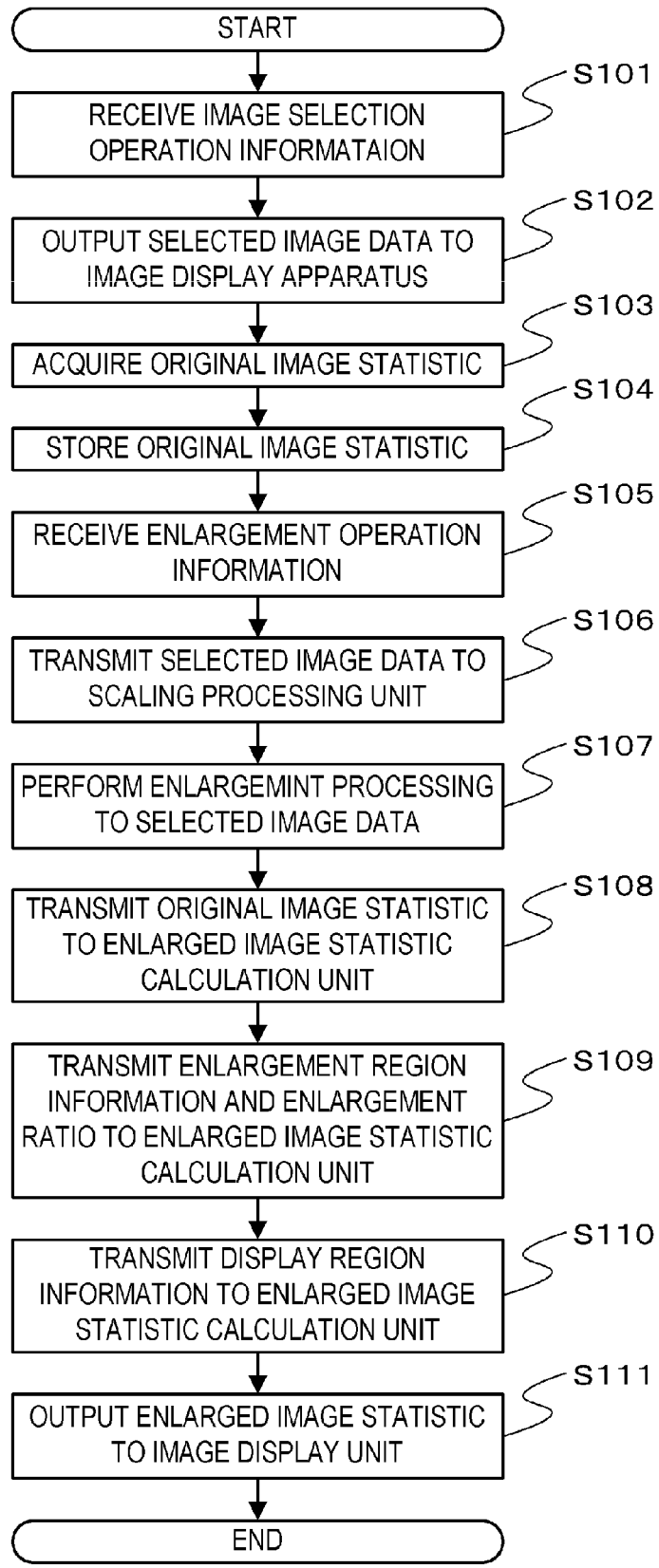

FIG. 8

| DIVIDED REGION | | ORIGINAL IMAGE STATISTIC |
|---|---|---|
| X | Y | Lg |
| 1 | 1 | 150 |
| 1 | 2 | 150 |
| 32 | 17 | 130 |
| 32 | 18 | 110 |

FIG. 9

| DIVIDED REGION | | ENLARGED IMAGE STATISTIC |
|---|---|---|
| X | Y | Lk |
| 3 | 2 | 160 |
| 3 | 3 | 160 |
| 22 | 16 | 170 |
| 22 | 17 | 170 |

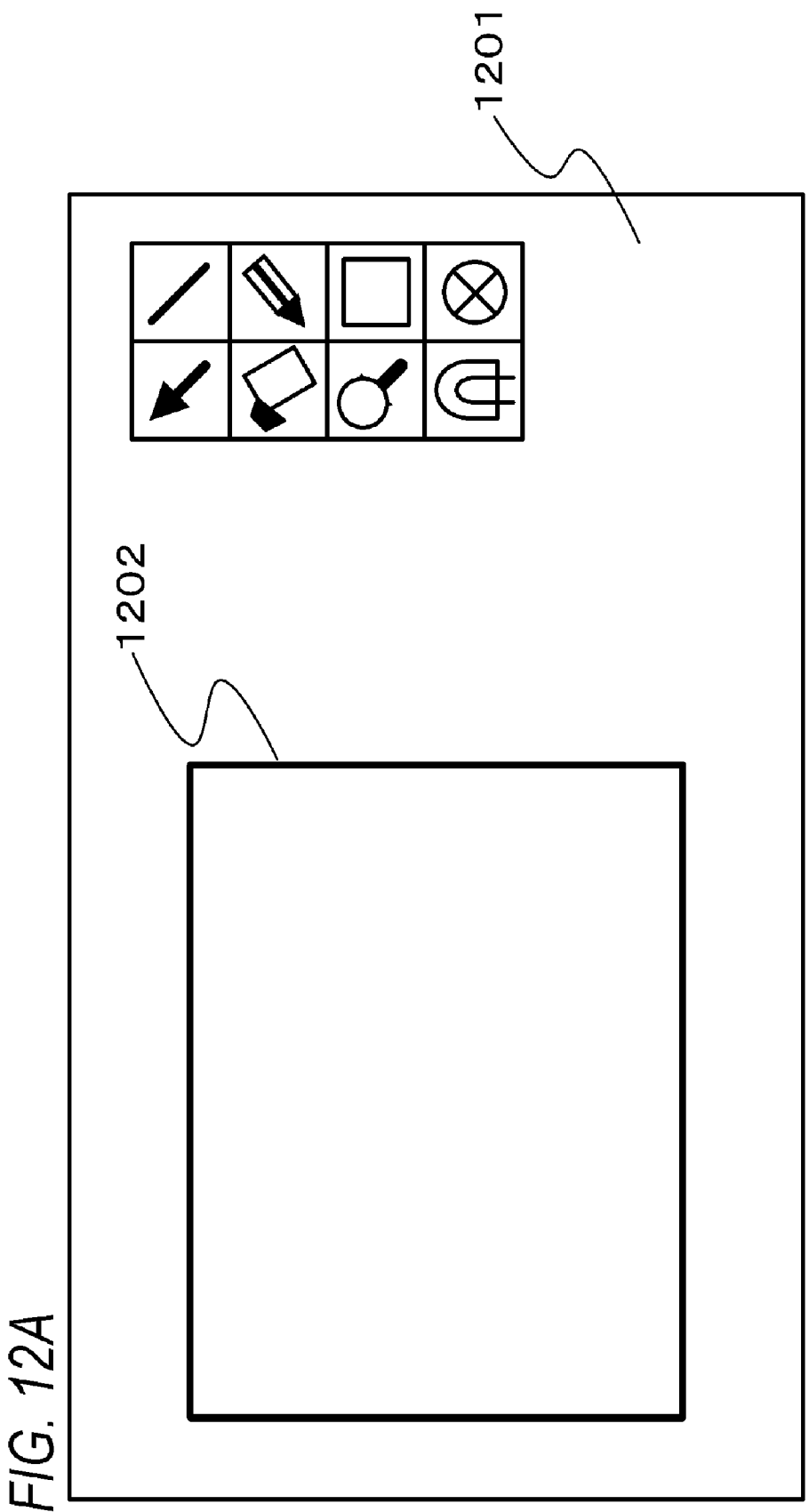

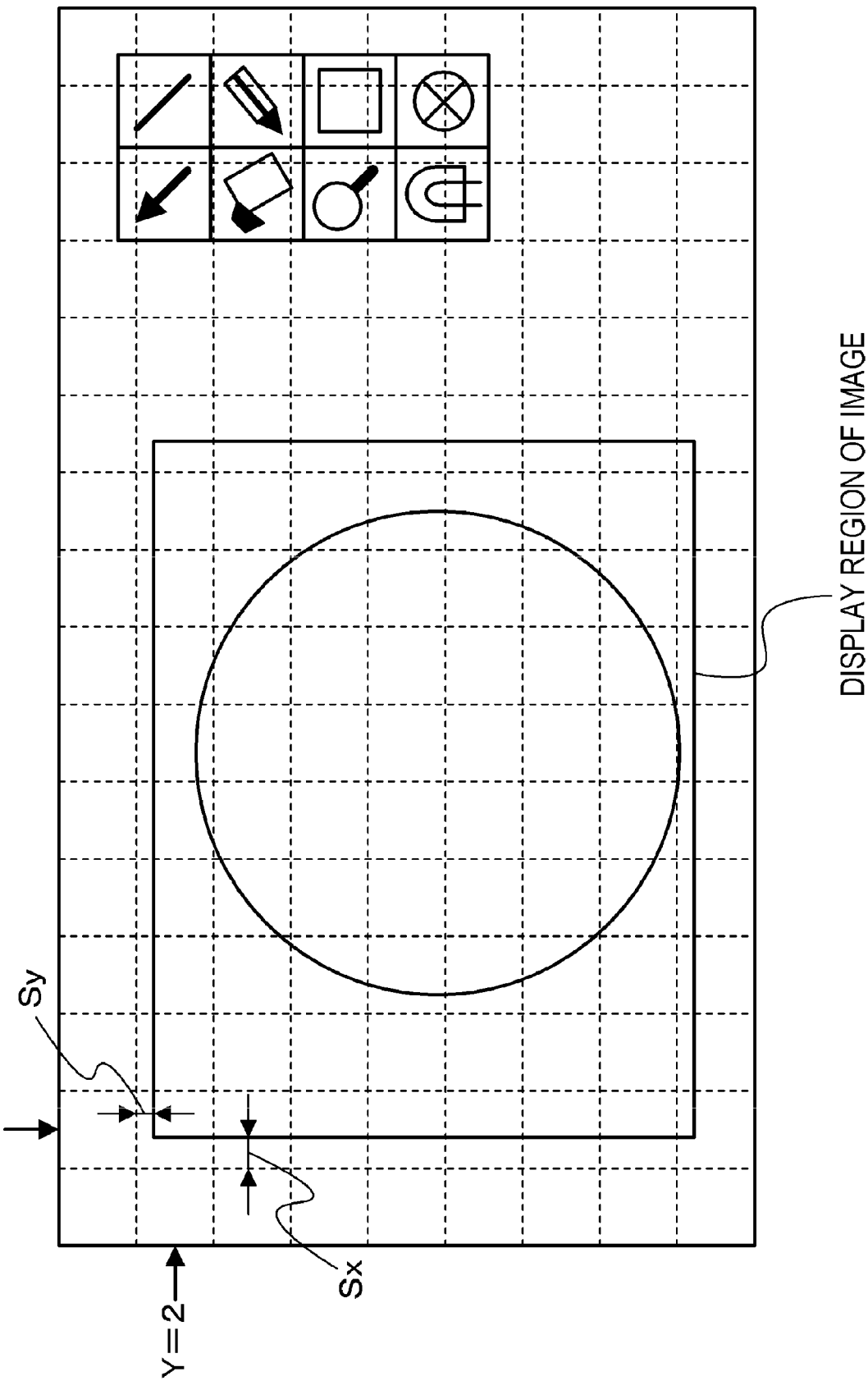

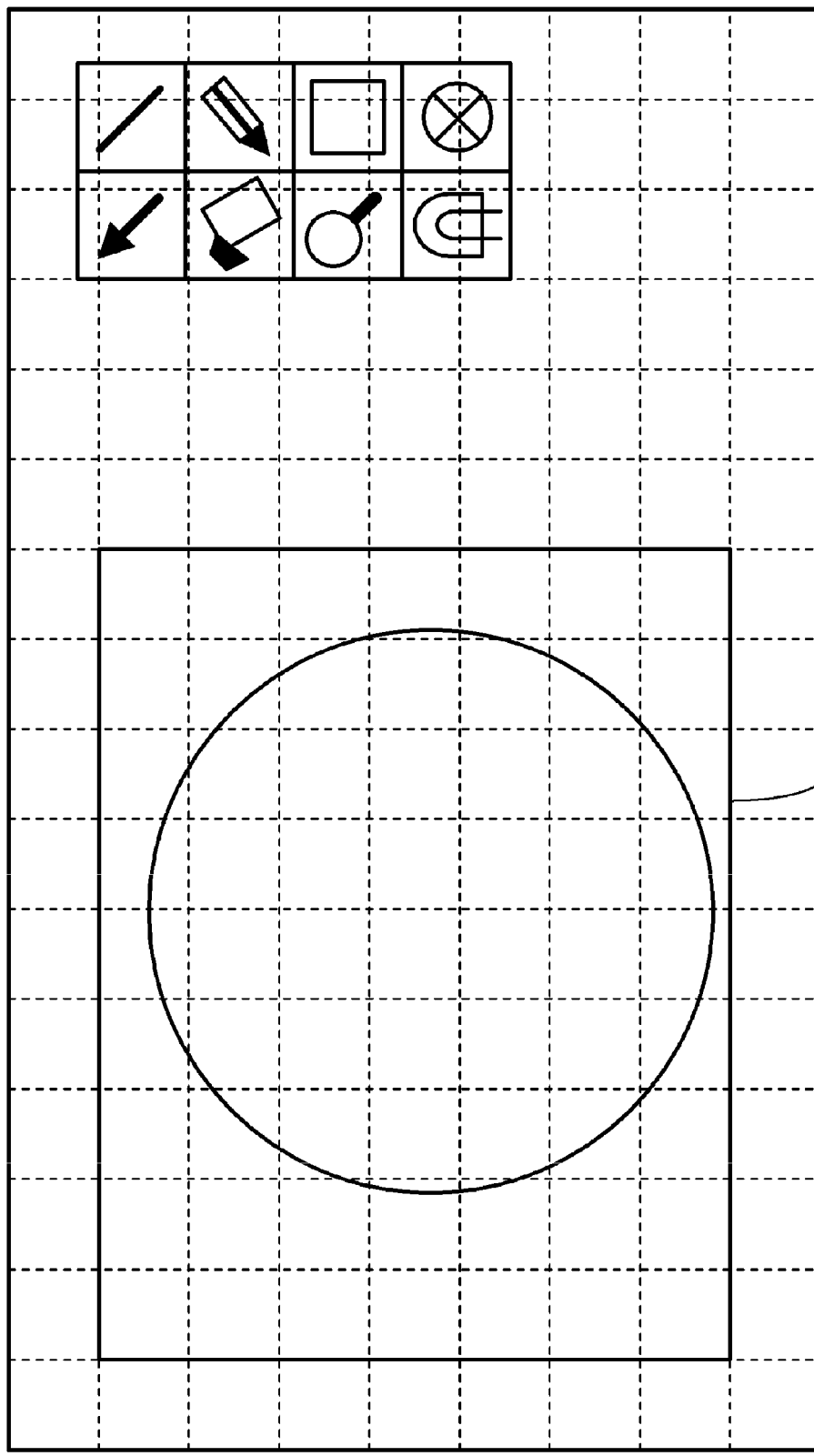

CONTROL APPARATUS AND CONTROL METHOD THEREOF

BACKGROUND OF THE INVENTION

Field of the Invention

The present invention relates to a control apparatus and a control method thereof.

Description of the Related Art

A liquid crystal display apparatus has a liquid crystal panel, a backlight disposed on the rear face side of the liquid crystal panel, and a control circuit for controlling the foregoing components.

In recent years, technology of dividing the backlight into a plurality of divided regions (light-emitting blocks) and controlling the brightness of each light-emitting block is being developed. This technology is capable of improving the contrast of the image displayed on the liquid crystal display apparatus, and reducing the power consumption. This kind of technology is referred to as local dimming.

With local dimming, image data is divied for each of the light-emitting blocks, and statistics (for instance, maximum gradation value) of the image data for each of the light-emitting blocks are obtained. In addition, the brightness of the light-emitting blocks is decided based on the acquired maximum gradation value (maximum brightness value) for each of the light-emitting blocks. Consequently, the brightness of the light-emitting blocks in a region of the image data with a high brightness value will be high, and the brightness of the light-emitting blocks in a region of the image data with a low brightness value will be low. Moreover, correction processing is performed to the image data based on the decided brightness for each of the light-emitting blocks so that, for instance, the brightness (display brightness) of the brightest part does not change for each of the light-emitting blocks. This kind of local dimming is disclosed, for example, in Japanese Patent Application Publication No. 2005-258403.

Conventional technology related to local dimming is also disclosed in, for instance, Japanese Patent Application Publication No. 2009-265671.

With the technology disclosed in Japanese Patent Application Publication No. 2009-265671, the representative gradation value for each of the light-emitting blocks is calculated from the image data. In addition, the fewer the light-emitting blocks having a representative gradation value that is not less than a reference value, the higher the brightness of the light-emitting blocks is set.

SUMMARY OF THE INVENTION

Meanwhile, an image editing application or an image display application generally has a function of enlarging and displaying an image.

Nevertheless, with the foregoing conventional technologies, the contrast is adjusted, with one light-emitting block as one light-emitting unit, by adjusting the brightness of the light-emitting unit for each light-emitting unit.

Thus, when an image is displayed upon performing conventional local dimming, the contrast will change based on the enlargement ratio of the image. For example, with an original image and an enlarged image in which the original image is enlarged to twice the size, the ratio of the size of the light-emitting unit relative to the display size of the image will change (region of the image corresponding to one light-emitting unit will change). Since the contrast is adjusted in greater detail when the size of the light-emitting unit relative to the display size of the image is smaller, the contrast will change between the original image and the enlarged image.

This kind of difference in contrast brings discomfort to the user, and is undesirable. In particular, when displaying the displayed image by changing the enlargement ratio (when displaying the same image upon changing the enlargement ratio), the foregoing difference in contrast tends to be detected by the user, and brings a feeling of strangeness to the user.

Moreover, an image editing application or an image display application generally has a function of displaying a plurality of images together.

In particular, when a plurality of images having different enlargement ratios relative to the original image are displayed together, due to the foregoing reason, a difference in contrast will occur among the foregoing images. This kind of difference in contrast (difference in contrast among the images that are displayed together) tends to be detected by the user, and brings a feeling of strangeness to the user.

The present invention provides technology capable of reducing the difference in contrast between images having different enlargement ratios relative to the original image.

A control apparatus, according to the present invention, for controlling a display apparatus having a liquid crystal panel and a backlight which is configured from a plurality of divided regions and which emits light, with one or more divided regions as one light-emitting unit, based on decided emission brightness of each light-emitting unit, comprises:

a control unit that sets, upon displaying a second image formed by enlarging a first image, a size of the light-emitting unit larger in comparison to a case of displaying the first image according to an enlargement ratio of the second image relative to the first image.

A control method, according to the present invention, for a control apparatus for controlling a display apparatus having a liquid crystal panel and a backlight which is configured from a plurality of divided regions and which emits light, with one or more divided regions as one light-emitting unit, based on decided emission brightness of each light-emitting unit, the method comprises:

a step of controlling to set, upon displaying a second image formed by enlarging a first image, a size of the light-emitting unit larger in comparison to a case of displaying the first image according to an enlargement ratio of the second image relative to the first image.

According to the present invention, it is possible to reduce the difference in contrast between images having different enlargement ratios relative to the original image.

Further features of the present invention will become apparent from the following description of exemplary embodiments with reference to the attached drawings.

BRIEF DESCRIPTION OF THE DRAWINGS

FIG. 4 is a flowchart showing an example of the processing flow of the control unit according to Embodiment 1;

FIG. 8 is a diagram showing an example of the list of original image statistics according to Embodiment 1;

FIG. 9 is a diagram showing an example of the list of enlarged image statistics according to Embodiment 1;

FIGS. 12A to 12C are diagrams showing an example of the processing performed by the region designating unit according to Embodiment 2;

FIGS. 16A and 16B are diagrams showing an example of the display region of the image, before and after adjustment, according to Embodiment 4.

DESCRIPTION OF THE EMBODIMENTS

The specific embodiments of the control apparatus and its control method of the present invention are now explained. The control apparatus according to this embodiment controls a display apparatus.

Embodiment 1

Figure 1:
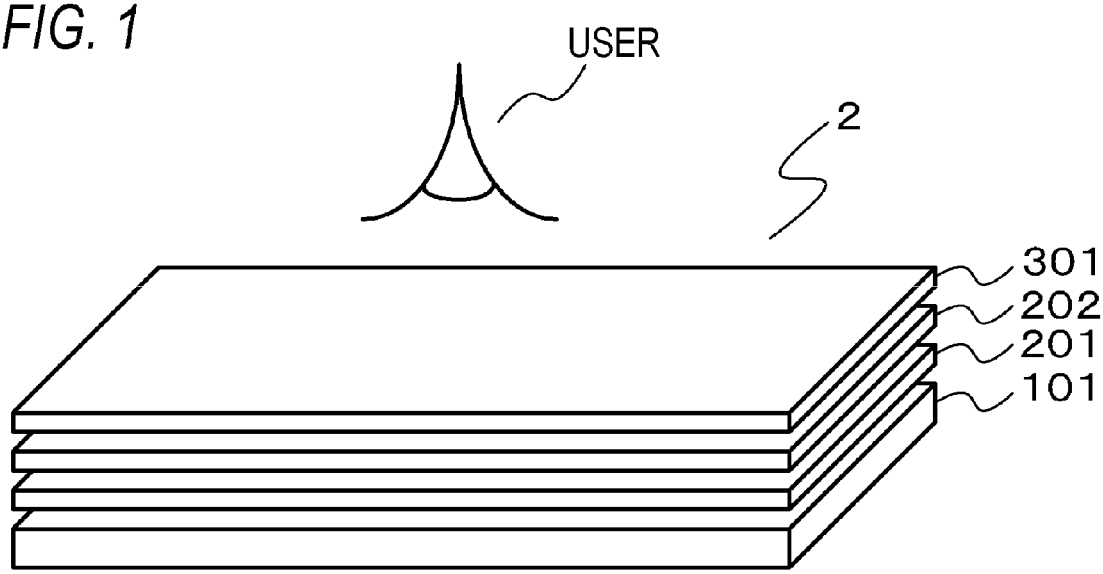
FIG. 1 is a schematic diagram showing an example of the structure of the image display apparatus according to Embodiment 1.

FIG. 1 is a diagram schematically representing the structure of an image display apparatus 2 (display apparatus) according to Embodiment 1 of the present invention. As shown in FIG. 1, the image display apparatus 2 has a backlight 101, a diffuser panel 201, an optical sheet 202, a liquid crystal panel 301, and so on.

Light emitted from the backlight 101 is diffused by the diffuser panel 201, directionality of the light is controlled by the optical sheet 202, and the light enters the back face of the liquid crystal panel 301. The liquid crystal panel 301 displays an image by changing the transmittance of the incident light.

Figure 2:
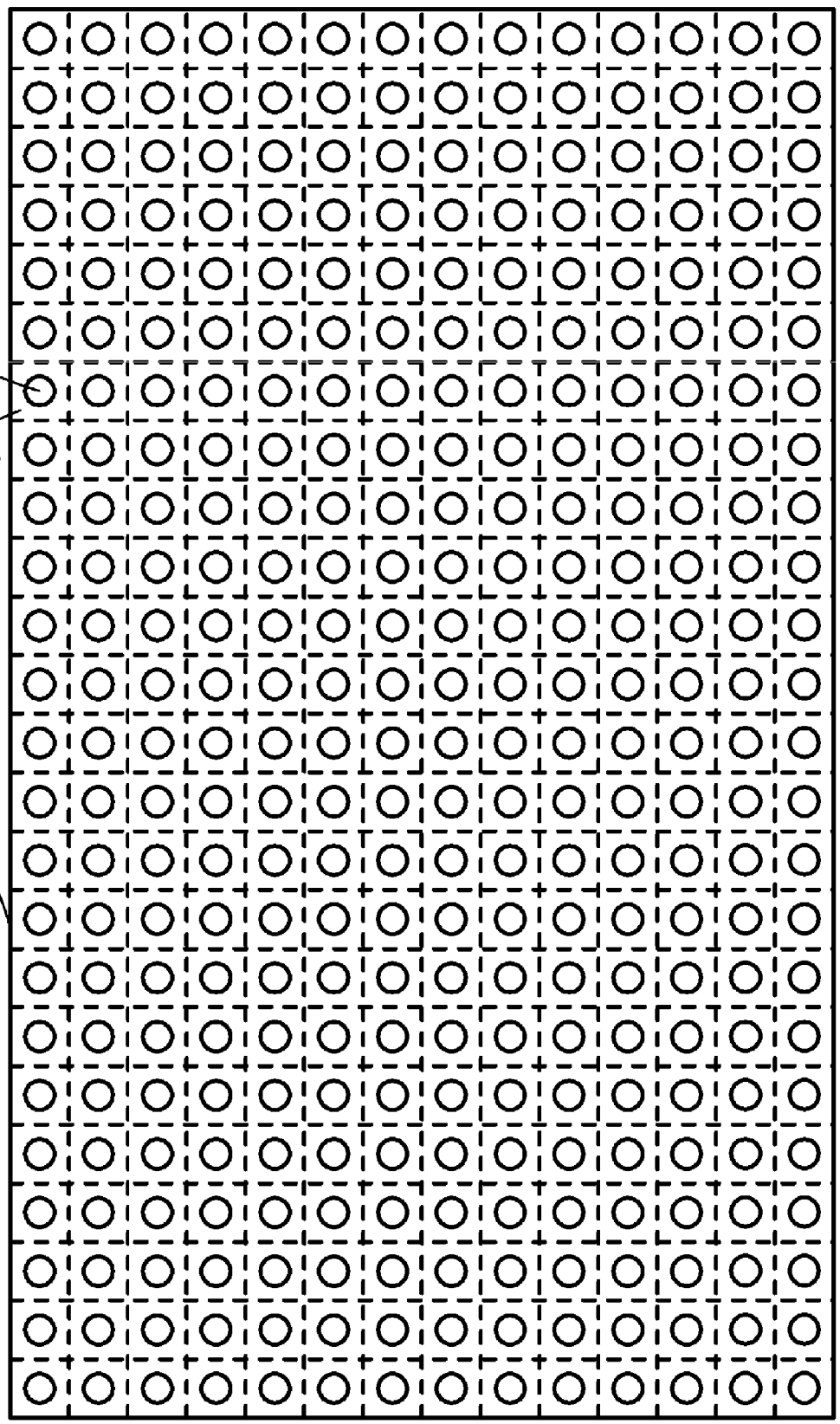
FIG. 2 is a schematic diagram showing an example of the arrangement of light sources of the backlight according to Embodiment 1.

FIG. 2 is a schematic diagram showing the arrangement of light sources of the backlight 101. The backlight 101 has a light source 103 for each divided region 102 showing with broken lines. The backlight 101 is configured from a plurality of divided regions, and emits light, with one or more divided regions as one light-emitting unit, based on a decided emission brightness (emission luminance) of each light-emitting unit. In addition, for each light-emitting unit, the transmittance of the liquid crystal element in the region of that light-emitting unit (transmission of light from the backlight) is controlled based on the emission brightness (of the backlight) of the light-emitting unit. Consequently, the contrast of the overall display image (displayed image) is improved. In this embodiment, in an initial state, the backlight 101 emits light, with one divided region as one light-emitting unit, based on decided emission brightness of each light-emitting unit. Note that, in this embodiment, while one light source 103 is disposed in one divided region 102, a plurality of light sources 103 may also be disposed in one divided region 102.

Figure 3:
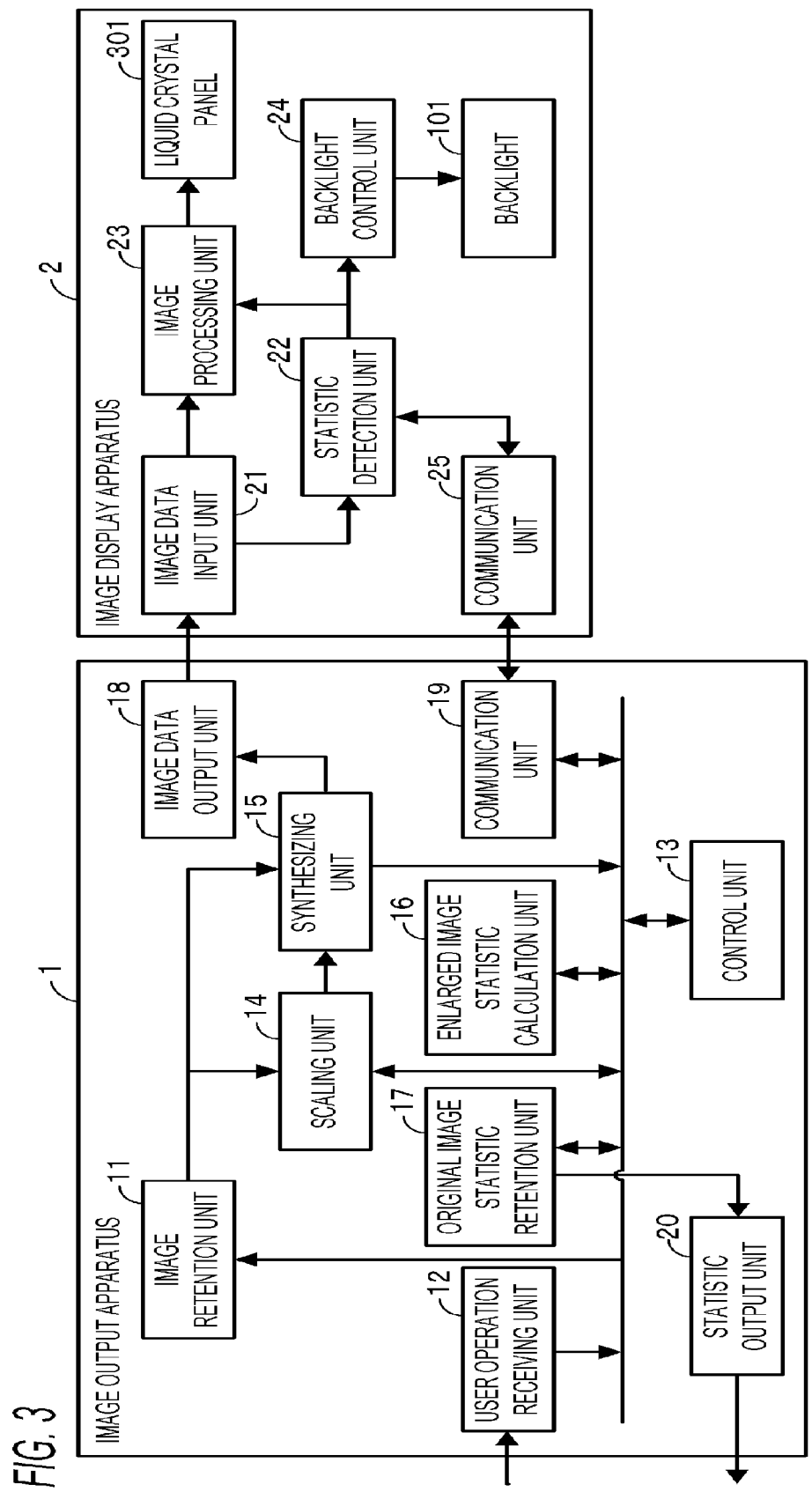
FIG. 3 is a block diagram representing the configuration of the image display system according to Embodiment 1.

FIG. 3 is a block diagram representing the configuration of the image display system according to Embodiment 1 of the present invention.

The image display system according to this embodiment is configured from an image output apparatus 1 (control apparatus) and an image display apparatus 2. In this embodiment, a case is explained where the image output apparatus 1 is a personal computer and the image display apparatus 2 is a liquid crystal display apparatus.

The respective blocks of the image output apparatus 1 are foremost explained.

An image retention unit 11 accumulates and retains data (image data) configuring the image.

The image retention unit 11 outputs designated image data to a synthesizing unit 15 or a scaling unit 14 according to instructions from a control unit 13.

A user operation receiving unit 12 receives signals according to the user operation. For example, the user operation receiving unit 12 receives signals according to the user operation (information representing the user operation; operation information) from a mouse or a keyboard connected to the image output apparatus 1.

The control unit 13 controls commands to the respective blocks and data communication between blocks according to the operation information received by the user operation receiving unit 12. The detailed processing contents of the control unit 13 will be described later.

When the operation information received by the user operation receiving unit 12 is enlargement operation information, the scaling unit 14 performs scaling processing (enlargement processing) to the image data input from the image retention unit 11 for implementing enlargement based on the enlargement ratio according to the user operation, and thereby outputs such image data. The enlargement operation information is information that is received when an operation for enlarging and displaying an image is performed.

Moreover, when a user operation for enlarging and displaying a part of the region of the image is performed, the scaling unit 14 extracts, from the input image data, data of a part of the region selected by the user, and performs enlargement processing to the extracted data.

Moreover, the scaling unit 14 outputs the enlargement region information representing which region in the image based on the input image data was enlarged and enlargement ratio.

The synthesizing unit 15 synthesizes the image data input from the image retention unit 11 and the scaling unit 14 with other image data as needed. For example, the synthesizing unit 15 generates and outputs synthesized image data in which image based on the foregoing input image data is disposed in a window of an image editing application or an image display application. Note that, in this embodiment, when image data is input from the image retention unit 11 (that is, when data of the original image is input), the synthesizing unit 15 outputs such image data as is.

Moreover, the synthesizing unit 15 generates and outputs the display region information representing the display region of the image based on the foregoing input image data.

An enlarged image statistic calculation unit 16 sets, upon displaying a second image formed by enlarging a first image, a size of the light-emitting unit larger in comparison to a case of displaying the first image according to an enlargement ratio of the second image relative to the first image so that the contrast of the display image does not change due to the enlargement ratio. Specifically, the size of the light-emitting unit is left to be the size of the divided regions upon displaying the first image, and the size of the light-emitting unit is changed to a size that is enlarged based on the enlargement ratio of the second image relative to the first image upon displaying the second image.

This embodiment explains a case where the first image is an original image where the enlargement ratio of the second image to the first image is 1:1 (100%), and the second image is an enlarged image formed by enlarged the original image.

Note that, in this embodiment, let it be assumed that information (divided region information) of the position (address representing the position of the divided regions) and size of the respective divided regions of the image display apparatus 2 is stored in the image output apparatus 1 in advance. In addition, the enlarged image statistic calculation unit 16 uses the divided region information to comprehend the position and size of the respective divided regions. However, the divided region information may also be acquired from the image display apparatus 2. The position information of the divided region may also be information such as the starting point (position at the upper left end of the divided region), the end point (position at the lower right end of the divided region), the central position, and so on. In the foregoing case, since it is possible to determine the size of the divided regions from the position information of the divided region, the divided region information may contain only the position information.

While described in detail later, in this embodiment, the image display apparatus 2 has a function of deciding the emission brightness of the backlight, for each divided region, by using the statistics of the image to be displayed in that divided region (backlight control unit 24).

Thus, in this embodiment, the enlarged image statistic calculation unit 16 performs the foregoing change by calculating the statistics (enlarged image statistics) of the respective divided regions in the case of displaying an enlarged image, and sending such statistics to the image display apparatus 2 via a communication unit 19. The enlarged image statistic calculation unit 16 performs the foregoing processing by using the statistics of the original image stored in an original image statistic retention unit 17, the enlargement region information and enlargement ratio acquired from the scaling unit 14, and the display region information acquired from the synthesizing unit 15. Specifically, the enlarged image statistic calculation unit 16 instructs the image display apparatus 2 so that the backlight control unit 24 uses the statistics of the light-emitting unit stored in the original image statistic retention unit 17 corresponding to that light-emitting unit as the statistics of the divided regions contained in the foregoing enlarged light-emitting unit.

The original image statistic retention unit 17 acquires and stores the statistics of each light-emitting unit (each divided region) of the original image in the case of displaying the original image. In this embodiment, while the statistics of the original image are acquired from the image display apparatus 2 via the communication unit 19, the statistics of the original image may also be calculated in the image output apparatus 1. For example, the statistics can also be calculated from the image data (image data of the original image) output from the image retention unit 11.

An image data output unit 18 outputs the image data output from the synthesizing unit 15 to the outside (image display apparatus 2).

The communication unit 19 sends and receives data to and from the image display apparatus 2 (communication unit 25).

A statistic output unit 20 is an interface for outputting the statistics of the original image stored in the original image statistic retention unit 17 to an external network such as a LAN.

The respective blocks of the image display apparatus 2 are now explained.

An image data input unit 21 outputs the input image data that was input from the outside to an image processing unit 23 and a statistic detection unit 22.

The statistic detection unit 22 calculates as the statistics, for each divided region, the maximum value (maximum gradation value) of the image data of that divided region from the input image data, and outputs such statistics to the image processing unit 23 and the backlight control unit 24. The statistics of each divided region are output to the respective blocks, for example, in the form of a list. Note that the statistics may also be a mean, mode, histogram or the like rather than the maximum gradation value. In this embodiment, the gradation value takes on a value of 0 to 255.

Moreover, when the enlarged image statistics are input by the communication unit 25, the statistic detection unit 22 outputs the input statistics directly to the image processing unit 23 and the backlight control unit 24.

The image processing unit 23 performs image processing to the input image data by using the statistics input from the statistic detection unit 22, and outputs the image data subject to image processing as output image data to the liquid crystal panel 301.

Specifically, for each pixel, an output gradation value (gradation value of output image data) LoutN is calculated from an input gradation value (gradation value of input image data) LinN of that pixel, and a maximum gradation value LinMAX (statistics) of the divided region to which that pixel belongs by using following Formula 1.

$$LoutN = LinN \times (255/LinMAX) \qquad \text{(Formula 1)}$$

In other words, the histogram of the input gradation value LinN is extended so that the maximum gradation value (maximum value of output gradation value LoutN) becomes 255 for each divided region.

The backlight control unit 24 calculates, for each divided region 102, the luminescent amount (emission brightness) based on the statistics input from the statistic detection unit 22, and outputs the calculation results as backlight control information to the backlight 101.

Specifically, for each divided region, the luminescent amount B is calculated from a maximum gradation value LinMAX (statistics) of that divided region and a maximum luminescent amount BMAX (maximum value of settable luminescent amount) of the backlight by using following Formula 2.

$$B = BMAX \times (LinMAX/255) \qquad \text{(Formula 2)}$$

Note that, in Formula 2, the relation of the statistics and the luminescent amount B is a proportional relation, but the relation is not limited thereto. The luminescent amount B may also be calculated such that the luminescent amount B increases exponentially as the statistics increase. Moreover, in Formula 1, the input gradation value and the output gradation value are of a proportional relation, but the relation of the input gradation value and the output gradation value is not limited thereto. As the processing method to be performed by the image processing unit 23 and the backlight control unit 24, the conventional local dimming technique can be applied as appropriate.

The backlight 101 causes the respective light sources 103 to emit light based on the backlight control information from the backlight control unit 24. Specifically, for each divided region, the backlight 101 causes the light sources 103 in that divided region to emit light based on the emission brightness calculated for that divided region.

A liquid crystal panel 301 controls the transmittance of the respective liquid crystal elements based on the output image data. In addition, the liquid crystal panel 301 displays an image of the output image data by transmitting the light irradiated from the backlight 101.

Here, the relation of a gradation value L (display brightness value; display gradation value) of a pixel on the screen, an output gradation value LoutN of that pixel, and the luminescent amount B of the divided region to which that pixel belongs is represented in following Formula 3.

$$L = LoutN \times (B/BMAX) \quad \text{(Formula 3)}$$

Based on Formulas 1 to 3 (specifically, by assigning Formula 1 and Formula 2 to Formula 3), it can be seen that the values of L and LinN are equivalent. In other words, it can be seen that control is performed so that the gradation value of the image is maintained even if the luminescent amount of the backlight changes due to the processing of the backlight control unit 24.

The communication unit 25 sends and receives data to and from the image output apparatus 1 (communication unit 19).

As described above, local dimming is realized by controlling the luminescent amount by the backlight control unit 24, and performing image processing to the input image data in the image processing unit 23.

Moreover, as described above, in local dimming, the output image data and the luminescent amount of the backlight are decided in the image processing unit 23 and the backlight control unit 24 based on the statistics from the statistic detection unit 22.

Thus, if the statistics (statistics of each divided region) obtained from data of the original image are used as the statistic of the corresponding region of the enlarged image, the contrast of the original image and the contrast of the enlarged image can be caused to coincide.

The processing flow of the control 13 in a case where the user performs the image selection operation (original image display command) and the image enlargement operation in this system is now explained with reference to FIG. 4.

When the user performs an image selection operation (selects an image), the control unit 13 receives information (image selection operation information) representing the image selection operation from the user operation receiving unit 12 (step S101).

Subsequently, the control unit 13 instructs the image retention unit 11 to output the data of the selected image to the synthesizing unit 15. Thereafter, the data of the selected image is output to the image display apparatus 2, and an image (original image) based on the data is displayed (step S102).

In addition, the control unit 13 outputs a statistic acquisition request to the communication unit 19. Consequently, the request is output to the image display apparatus 2, and the statistics of each light-emitting unit (each divided region) of the original image are acquired as the response signal from the image display apparatus 2 (step S103).

Subsequently, the control unit 13 outputs the statistics of the original image acquired via the communication unit 19 to the original image statistic retention unit 17. Consequently, the statistics (original image statistics) of each light-emitting unit of the original image are stored in the original image statistic retention unit 17 (step S104).

When the user performs an image enlargement operation (enlarges the image), the control unit 13 receives information (enlargement operation information) representing the enlargement operation from the user operation receiving unit 12 (step S105). The enlargement operation information includes, for example, the enlargement ratio, and information (enlargement region information) of the region of the image to be enlarged and displayed.

Subsequently, the control unit 13 instructs the image retention unit 11 to output the data of the selected image to the scaling unit 14 (step S106).

In addition, the control unit 13 outputs the enlargement operation information to the scaling unit 14. Consequently, the scaling unit 14 performs enlargement processing to the data of the selected image. In addition, a synthesized image data, in which an image subject to enlargement processing is synthesized on the window of an application, is output to the display apparatus (step S107).

Subsequently, the control unit 13 reads the original image statistics from the original image statistic retention unit 17 and outputs such original image statistics to the enlarged image statistic calculation unit 16 (step S108).

In addition, the control unit 13 acquires the enlargement region information and the enlargement ratio from the scaling unit 14, and outputs the acquired enlargement region information and enlargement ratio to the enlarged image statistic calculation unit 16 (step S109).

Subsequently, the control unit 13 acquires the display region information from the synthesizing unit 15, and outputs the acquired display region information to the enlarged image statistic calculation unit 16 (step S110).

In addition, the control unit 13 outputs the enlarged image statistics calculated by the enlarged image statistic calculation unit 16 to the communication unit 19. Consequently, the enlarged image statistics calculated by the enlarged image statistic calculation unit 16 are output to the display apparatus. In addition, local dimming is performed by using the enlarged image statistics calculated by the enlarged image statistic calculation unit 16, and an enlarged image is displayed (step S111).

The calculation method of the enlarged image statistics of the enlarged image statistic calculation unit 16 is now explained with reference to FIGS. 5A and 5B.

In the ensuing explanation, a case where the number of divided regions of the image display apparatus 2 is M×N divided regions (M and N are integers of 2 or higher) is explained. M represents the number of divided regions in the horizontal direction, and N represents the number of divided regions in the vertical direction.

Figure 5A:
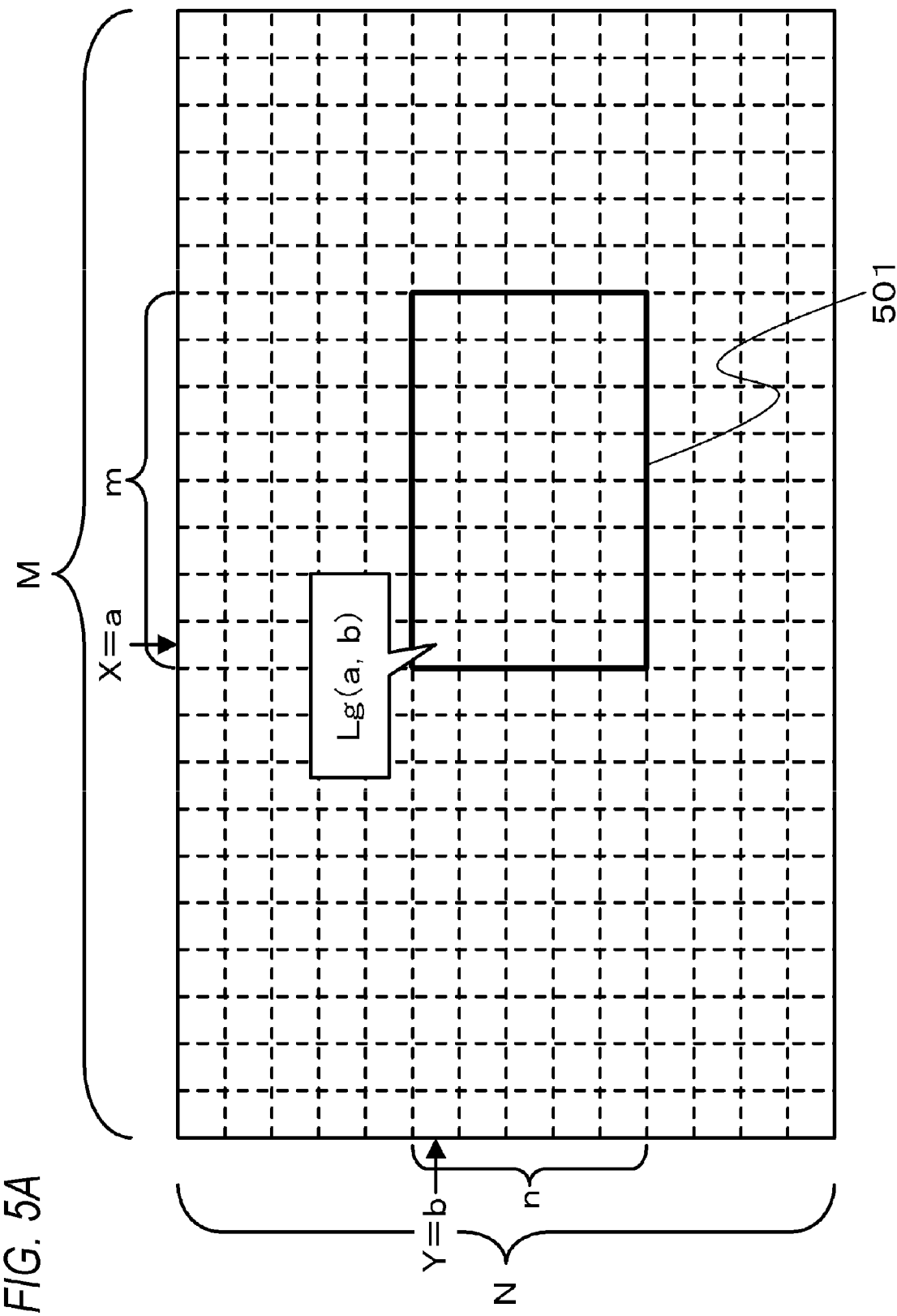
FIGS. 5A and 5B are diagrams showing an example of the calculation method of the enlarged image statistic according to Embodiment 1.

FIG. 5A is a diagram showing the selected region 501 (region to be enlarged and displayed) that was selected in the enlargement operation. In the example of FIG. 5A, the position (starting point of the selected region 501) of the divided regions positioned at the uppermost/leftmost part of the selected region 501 is X=a, Y=b (a and b are integers of $1 \leq a \leq M$, $1 \leq b \leq N$). X shows what number that divided region is as the nth divided region from the left in the horizontal direction. Y shows what number that divided region is as the nth divided region from the top in the vertical direction. In the example of FIG. 5A, the selected region 501 includes m×n divided regions. Lg (a, b) shows the statistics of the original image (statistics of the original image retained in the original image statistic retention unit 17) obtained for the divided regions of X=a, Y=b.

Figure 5B:
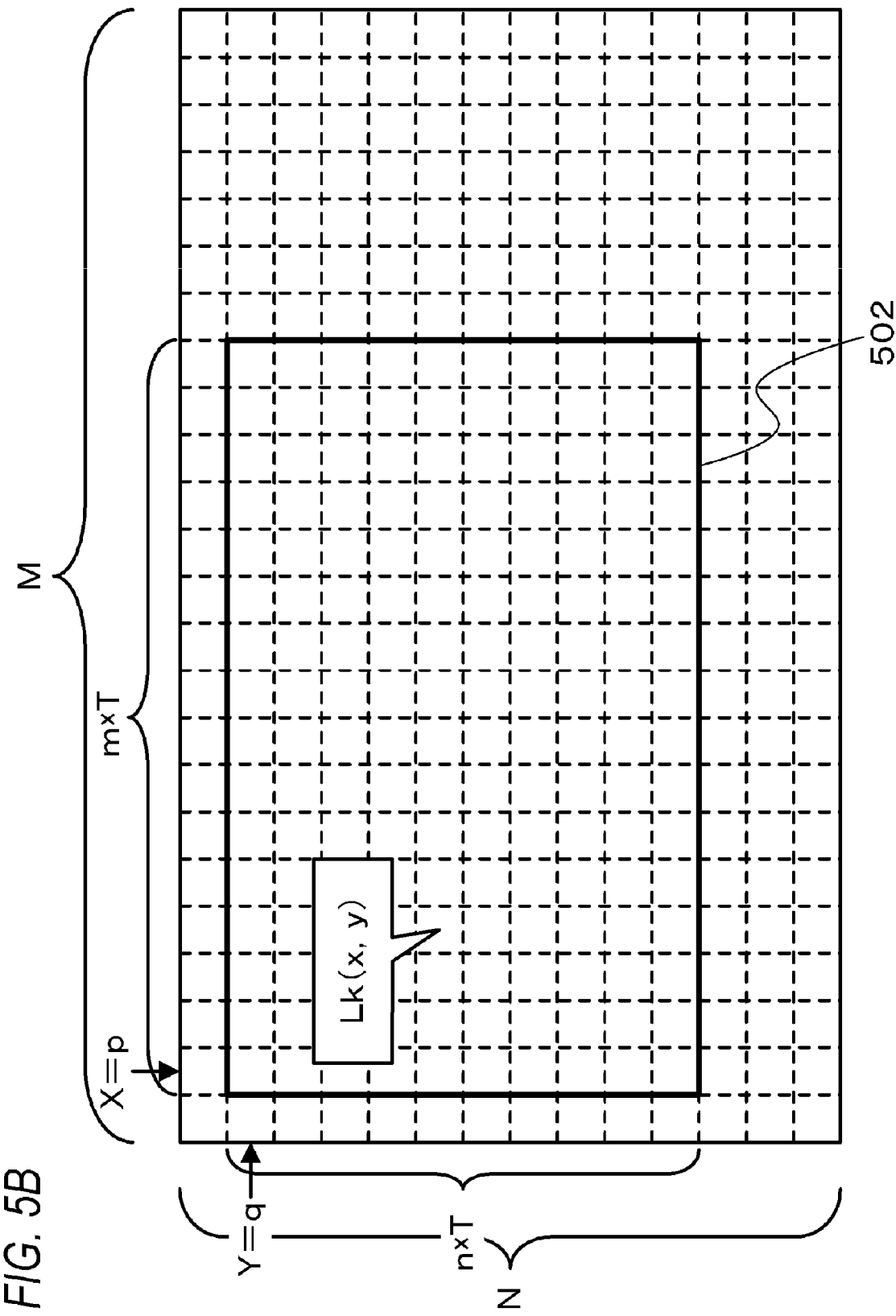

FIG. 5B is a diagram showing a display region 502 of the enlarged image. In the example of FIG. 5B, the starting point of the display region of the enlarged image is X=p, Y=q.

Here, if the enlargement operation is an operation of enlarging, by T times, and displaying the image of the selected region 501 (in other words, when the enlargement ratio designated in the enlargement operation is T×100%), the size of the display region of the enlarged image will be (m×T)×(n×T).

The enlarged image statistic calculation unit 16 calculates the statistics (enlarged image statistics) for each divided region so that the size of one light-emitting unit becomes a size of a region of T×T divided regions from a size of one divided region. Specifically, the enlarged image statistic calculation unit 16 calculates the statistics Lk (x, y) of the divided regions (divided regions of X=x, Y=y(p≤x<(p+m×T), q≤y<(q+n×T)) in the display region 502 based following Formula 4. Note that, in Formula 4, (x−p)/T, (y−q)/T is rounded down to the nearest whole number.

$$Lk(x,y)=Lg(a+(x-p)/T,b+(y-q)/T) \quad \text{(Formula 4)}$$

To the T×T divided regions included in the enlarged light-emitting unit, the statistics (original image statistics) of the light-emitting unit stored in the original image statistic retention unit 17 corresponding to that enlarged light-emitting unit are thereby assigned as the enlarged image statistics. For example, Lg (a, b) is assigned as the enlarged image statistics to the T×T divided regions of X=p to p+T, Y=q to q+T.

Figure 6:
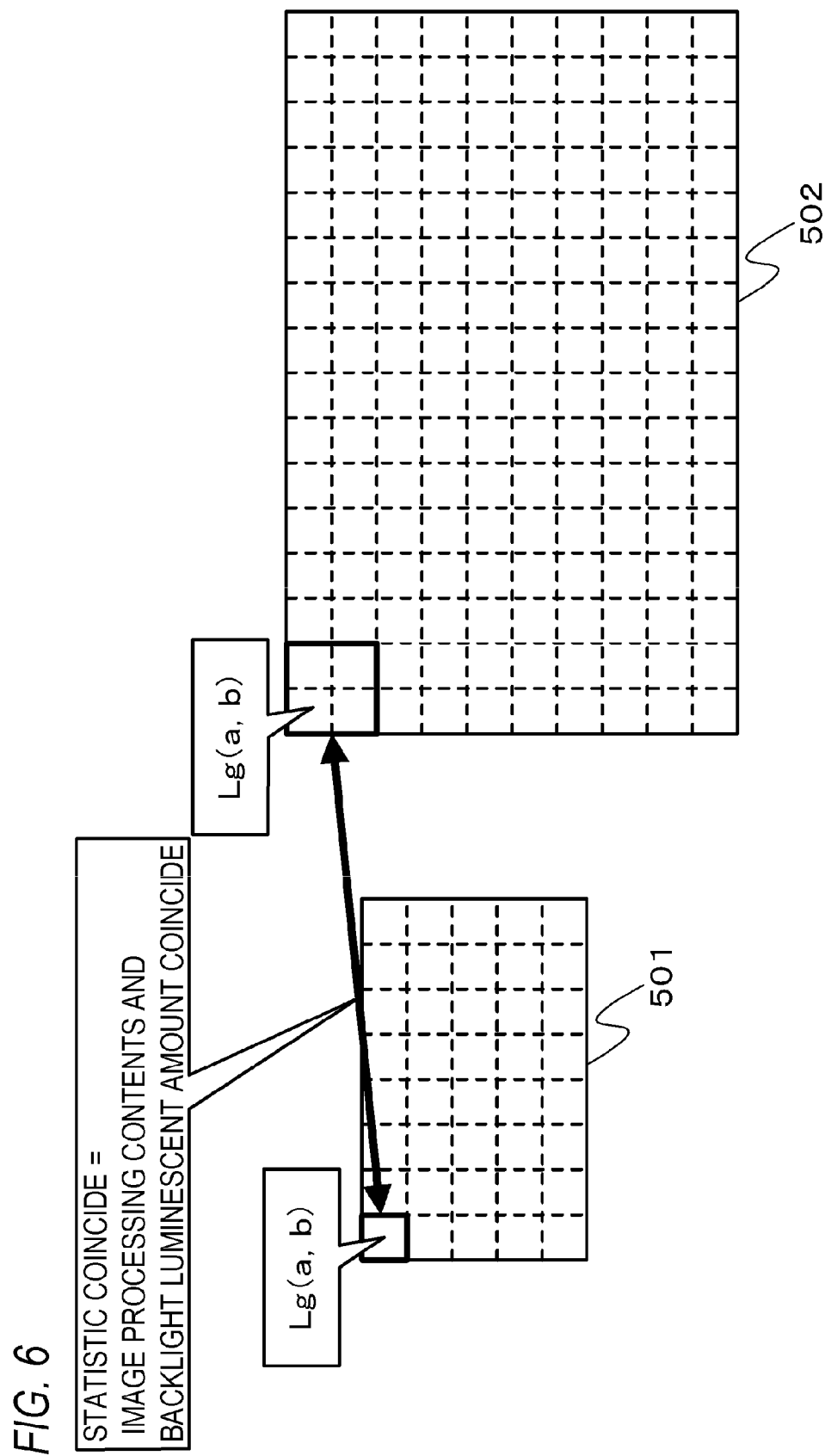
FIG. 6 is a diagram showing an example of the processing performed by the enlarged image statistic calculation unit according to Embodiment 1.

As a result of using the statistics Lk (p, q) as the statistics of the divided regions of X=p, Y=q in the image processing unit 23 and the backlight control unit 24, the image processing contents and the backlight luminescent amount of the enlarged image and the original image can be caused to coincide. Consequently, the contrast of the enlarged image and the contrast of the original image can be caused to coincide. For example, the enlarged image displayed in the divided regions of X=p to p+T, Y=q to q+T corresponds to the original image displayed in the divided regions of X=a, Y=b. In this embodiment, Lg (a, b) is used as the statistics of the divided regions of X=p to p+T, Y=q to q+T. Thus, the contrast of the enlarged image displayed in the divided regions of X=p to p+T, Y=q to q+T and the contrast of the original image displayed in the divided regions of X=a, Y=b can be caused to coincide (FIG. 6).

A specific example of the operation of the overall system is now explained.

Figure 7A:
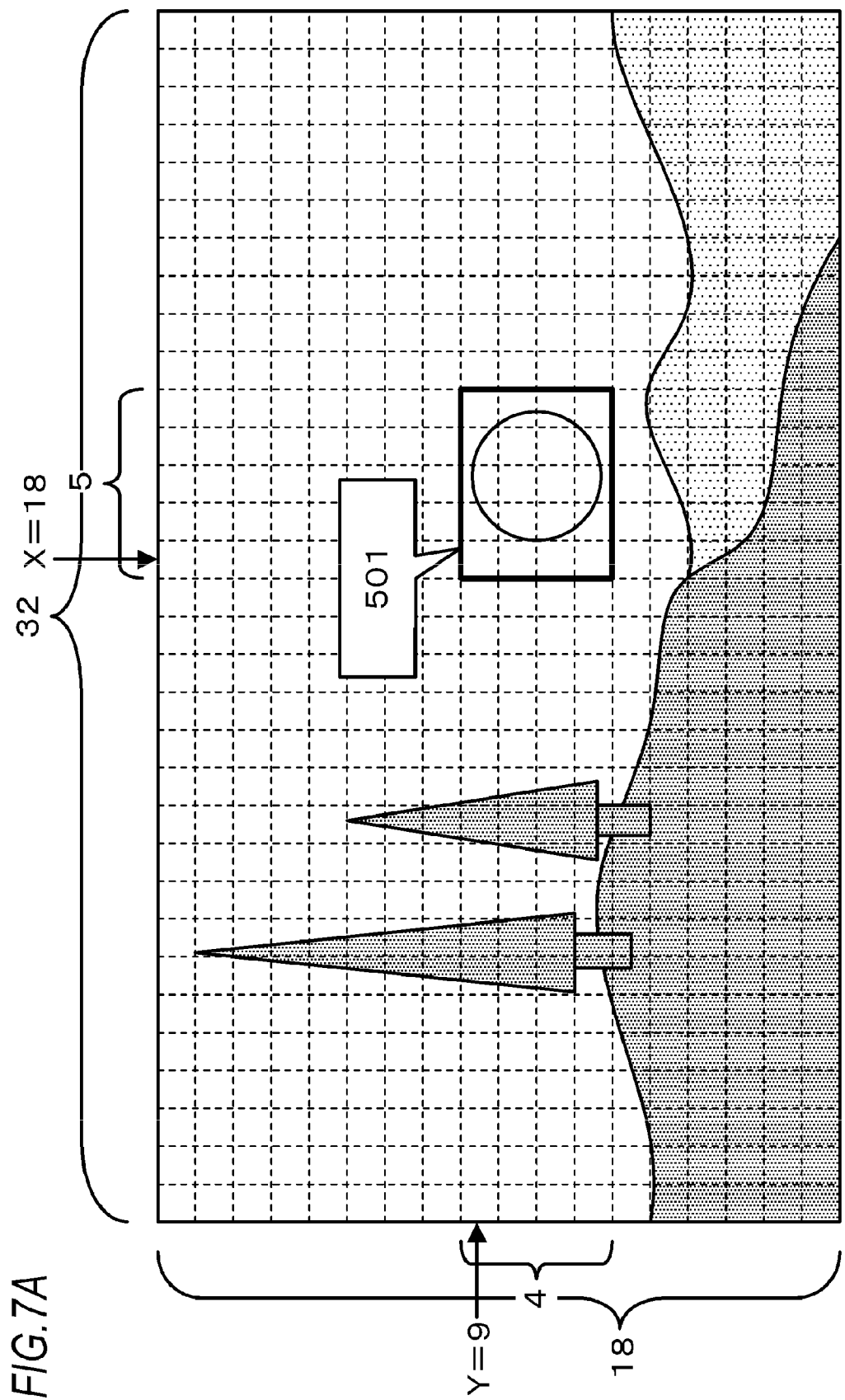
FIGS. 7A and 7B are diagrams showing an example of the display screen and the divided regions according to Embodiment 1.

FIG. 7A is a diagram schematically showing a display screen example when a user operation for displaying the original image (selection of original image) is performed and the respective divided regions (broken lines). In the example of FIG. 7A, the number of divided regions is 32×18 divided regions. Moreover, in the example of FIG. 7A, the region containing 5×4 divided regions with a starting point of X=18, Y=9 is selected as the selected region 501.

FIG. 8 shows a list of the statistics Lg (original image statistics) of the respective divided regions detected by the statistic detection unit 22 upon displaying the original image of FIG. 7A. This statistic list is output to the respective blocks of the image display apparatus.

Figure 7B:
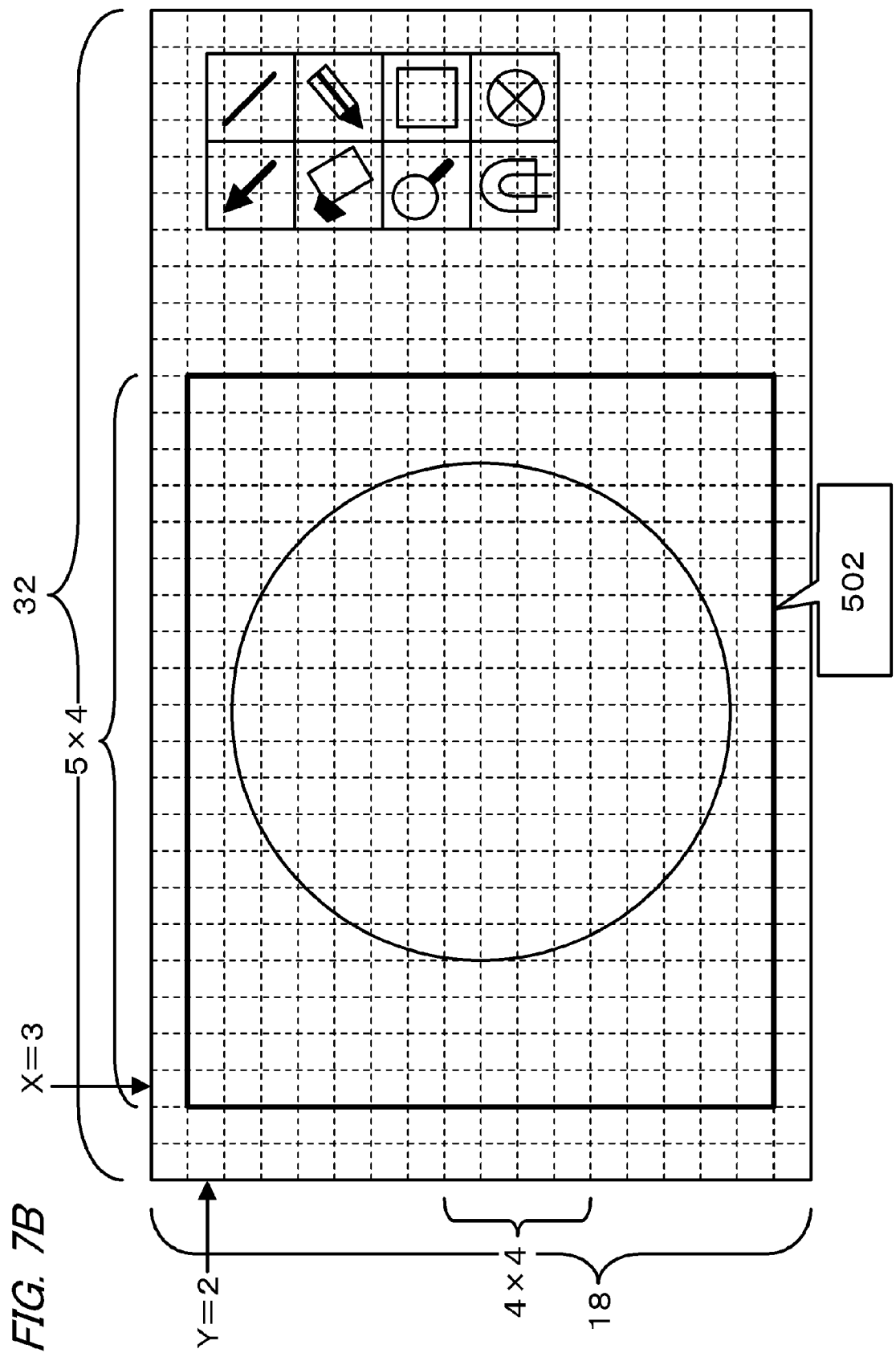

FIG. 7B is a diagram schematically showing a display screen example when a user operation of enlarging, by 4 times, and displaying the image of the selected region 501 and the respective divided regions. In the example of FIG. 7B, the display region 502 of the enlarged image contains 20×16 divided regions with a starting point of X=3, Y=2. In other words, in the example of FIG. 7B, an enlarged image is displayed at least in a part of the region of the screen. With the method of this embodiment, the size of the light-emitting unit is enlarged only for the region where the enlarged image is displayed.

FIG. 9 shows a list of the statistics (enlarged image statistics) of the respective divided regions in the display region 502 calculated from the statistic Lg of FIG. 8.

The statistics of the respective divided regions in the display region 502 are calculated using Formula 4 as described above. For example, based on Formula 4, the statistic Lk (10, 15) of the divided regions of X=10, Y=15 will be as follows.

$$Lk(10, 15) = Lg(18 + (10 - 3)/4, 9 + (15 - 2)/4)$$

$$= Lg(19, 12)$$

Figure 10:
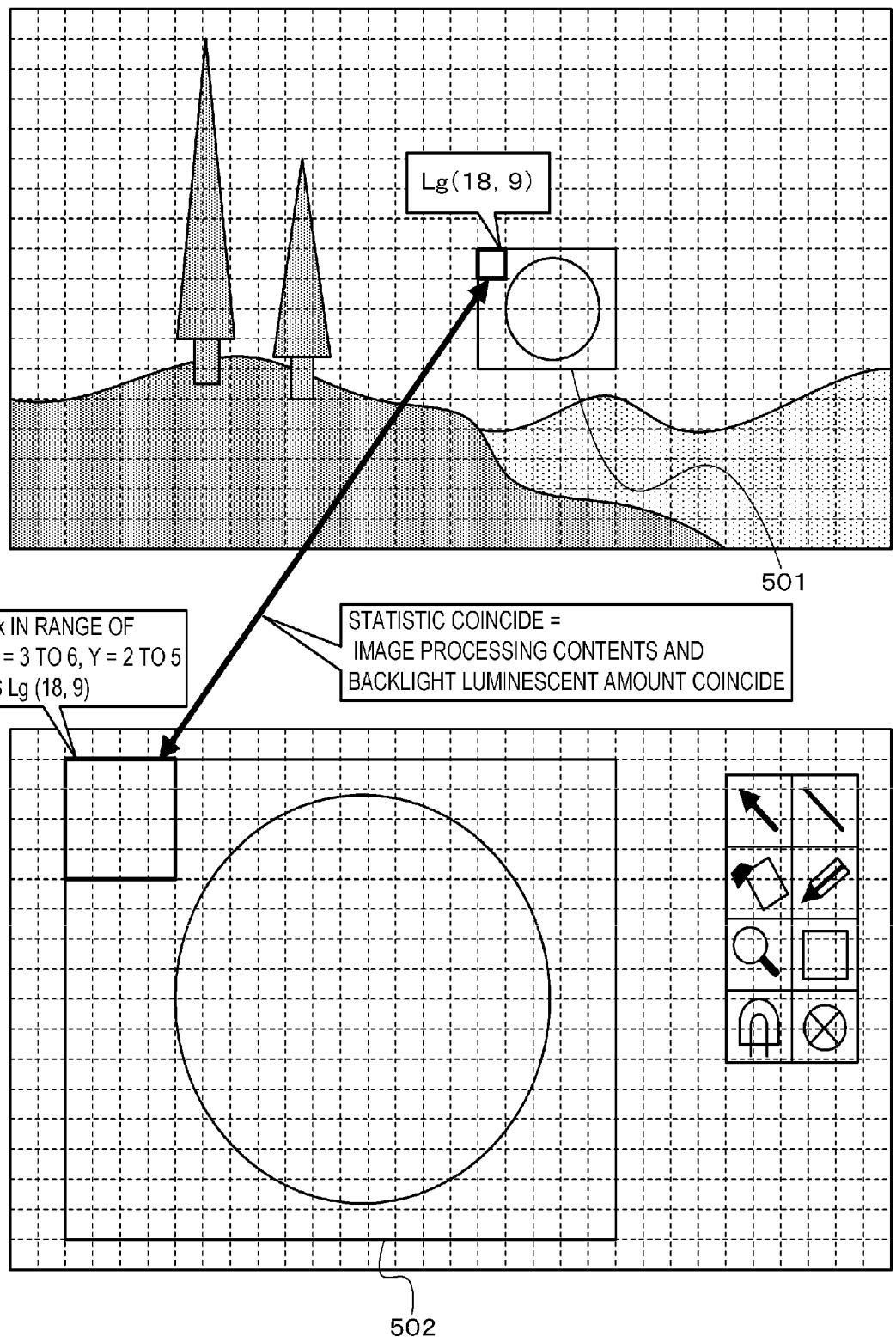
FIG. 10 is a diagram showing an example of the processing performed by the enlarged image statistic calculation unit according to Embodiment 1.

Consequently, to the 4×4 divided regions included in the enlarged light-emitting unit, the statistics (original image statistics) of the light-emitting unit stored in the original image statistic retention unit 17 corresponding to that enlarged light-emitting unit are assigned as enlarged image statistics. For example, as shown in FIG. 10, Lg (18, 9) is assigned as the enlarged image statistics to the 4×4 divided regions of X=3 to 6, Y=2 to 5.

The list of FIG. 9 includes, as the statistics, only the statistic Lk of the display region 502. The list of FIG. 9 is output to the image display apparatus 2 as the statistics (enlarged image statistics) for the display region 502 of the enlarged image.

When the enlarged image statistics are input, the statistic detection unit 22 outputs the input enlarged image statistics to the image processing unit 23 and the backlight control unit 24 as the statistics of the display region 502.

When the statistics are input from the statistic detection unit 22, the image processing unit 23 performs image processing, for each divided region, to the input image from the image data input unit 21, and outputs the processed image as an output image to the liquid crystal panel 301.

Here, the statistic Lk of one light-emitting unit of the display region 502 is set to have the same value as the statistic Lg of the corresponding one light-emitting unit of the selected region 501. Thus, the output gradation value LoutN (value obtained from Formula 1) of the display region 502 and the selected region 501 will be the same value (applied image processing will coincide).

The backlight control unit 24 obtains the luminescent amount of each divided region 102 based on the statistics from the statistic detection unit 22, and outputs the obtained luminescent amount as backlight control information to the backlight 101.

Here, the statistic Lk of one light-emitting unit of the display region 502 is set to have the same value as the statistic Lg of the corresponding one light-emitting unit of the selected region 501. Thus, the luminescent amount B (value obtained from Formula 2) of the display region 502 and the selected region 501 will be the same value.

The backlight 101 causes the light sources 103 to emit light for each divided region 102 based on the backlight control information from the backlight control unit 24.

The liquid crystal panel 301 modulates the light irradiated from the backlight 101, and displays an image based on the output image data from the image processing unit 23 on the screen.

Here, since the same values are set for the output gradation value LoutN and the luminescent amount B with respect to the display region 502 and the selected region 501, the display gradation value L (value obtained from Formula 3) of the display region 502 and the selected region 501 on the liquid crystal panel 301 will be the same value.

Based on the foregoing results, the difference in contrast of the original image and contrast of the enlarged image can be reduced.

As described above, according to this embodiment, upon displaying the second image (enlarged image), the size of the light-emitting unit is changed to a size obtained by enlarging the size of the divided regions based on the enlargement ratio of the second image relative to the first image (original image). Consequently, the difference in contrast between the first image and the second image can be reduced.

Note that, while this embodiment changed the size of the divided regions to a size that is enlarged based on the enlargement ratio of the second image relative to the first image, the configuration is not limited thereto. Upon displaying the second image, if the size of the light-emitting unit is caused to be larger than the case of displaying the first image, the ratio of the size of the light-emitting unit relative to the display size of the image will approach the ratio in the case of displaying the first image and, therefore, the difference in contrast between the first image and the second image can be reduced.

Note that, while this embodiment adopted a configuration where the enlarged image statistics are calculated by the image output apparatus 1, the configuration is not limited thereto. The image output apparatus 1 can also instruct the image display apparatus 2 so that the luminescent amount of each divided region is calculated by the image output apparatus 1, and the backlight is caused to emit light in the calculated luminescent amount.

Note that, while this embodiment explained a case where the first image is an original image having an enlargement ratio of 100%, and the second image is an enlarged image of an enlarged original image, the first and second images are not limited thereto. The first image may also be a reduced image of the original image or an enlarged image of the original image. The second image merely needs to be an enlarged image of the first image.

Note that, while this embodiment adopted a configuration where the size of the light-emitting unit is enlarged only for the region where the second image is displayed, the configuration is not limited thereto. It will suffice so long as the size of the light-emitting unit of the region where the second image is displayed is enlarged, and, for instance, the size of the light-emitting unit of the entire region of the screen may also be enlarged.

Note that, while this embodiment adopted a configuration where the image data (data of original image) input to the synthesizing unit 15 is output directly to the image data output unit 18, without performing synthesizing processing, upon displaying the original image, the configuration is not limited thereto. The synthesizing unit 15 may also generate and output synthesized image data in which the original image and the window of the application are synthesized.

Moreover, upon displaying the original image, the image data may be sent from the image retention unit 11 to the image data output unit 18 (without going through other functional blocks).

Note that, while this embodiment explained a case where the image output apparatus 1 and the image display apparatus 2 are provided separately, the image output apparatus 1 and the image display apparatus 2 may also be configured integrally.

Note that, while this embodiment adopted a configuration where the image data is accumulated in the apparatus, the image data can also be acquired from an external network such as a LAN or from a media such as an SD card or a USB memory.

Note that, while this embodiment adopted a configuration where one divided region is one light-emitting unit in the initial state, the configuration is not limited thereto. In the initial state, the region configured from a plurality of divided regions may be one light-emitting unit. For example, the region configured from 1×2 divided regions upon displaying the first image may be one light-emitting unit.

Embodiment 2

Embodiment 1 explained an example of calculating the enlarged image statistics in the image output apparatus. In this embodiment, the image output apparatus causes the contrast of the first image (original image) and the contrast of the second image (enlarged image) to coincide by controlling the region (statistic acquisition region) to be referred to by the image display apparatus upon acquiring the statistics. Note that the explanation of the same processing as Embodiment 1 is omitted.

As with Embodiment 1, the image display apparatus according to this embodiment has a function of acquiring, for each divided region, the statistics of the image displayed in that divided region (statistic detection unit 22). Moreover, as with Embodiment 1, the image display apparatus according to this embodiment has a function of deciding, for each divided region, the emission brightness of the backlight by using the foregoing acquired statistics (backlight control unit 24).

Note that, in this embodiment, the statistic detection unit 22 acquires, for each divided region, the statistics based on the region designation information set to that region. The region designation information is information showing the region (statistic acquisition region) for which the statistics are acquired. In the initial state, the region designation information of the divided regions represent those divided regions. Thus, in the initial state, for each divided region, the statistics of the image displayed in that divided region are acquired.

In this embodiment, let it be assumed that the region designation information includes, for each divided region, the starting point (position of the uppermost/leftmost divided region among the divided regions including the statistic acquisition region) and the end point (position of the lowermost/rightmost divided region among the divided regions including the statistic acquisition region) of the statistic acquisition region.

The image output apparatus according to this embodiment has a region designating unit in substitute for the enlarged image statistic calculation unit 16 of Embodiment 1.

The region designating unit generates and outputs region designation information by using the display region information (information of the display region of the original image and the enlarged image) and the enlargement ratio of the image to be displayed relative to the original image. For example, upon displaying an enlarged image, the region designating unit instructs the statistic detection unit 22 to acquire the statistics of the divided regions included in the enlarged light-emitting unit from the region of that light-emitting unit.

Note that, in this embodiment, let it be assumed that the display region information and the enlargement ratio are output from the synthesizing unit 15. Specifically, the synthesizing unit 15 outputs information in which the enlargement ratio of the display region is associated with the information representing that display region of the image.

Figure 11:
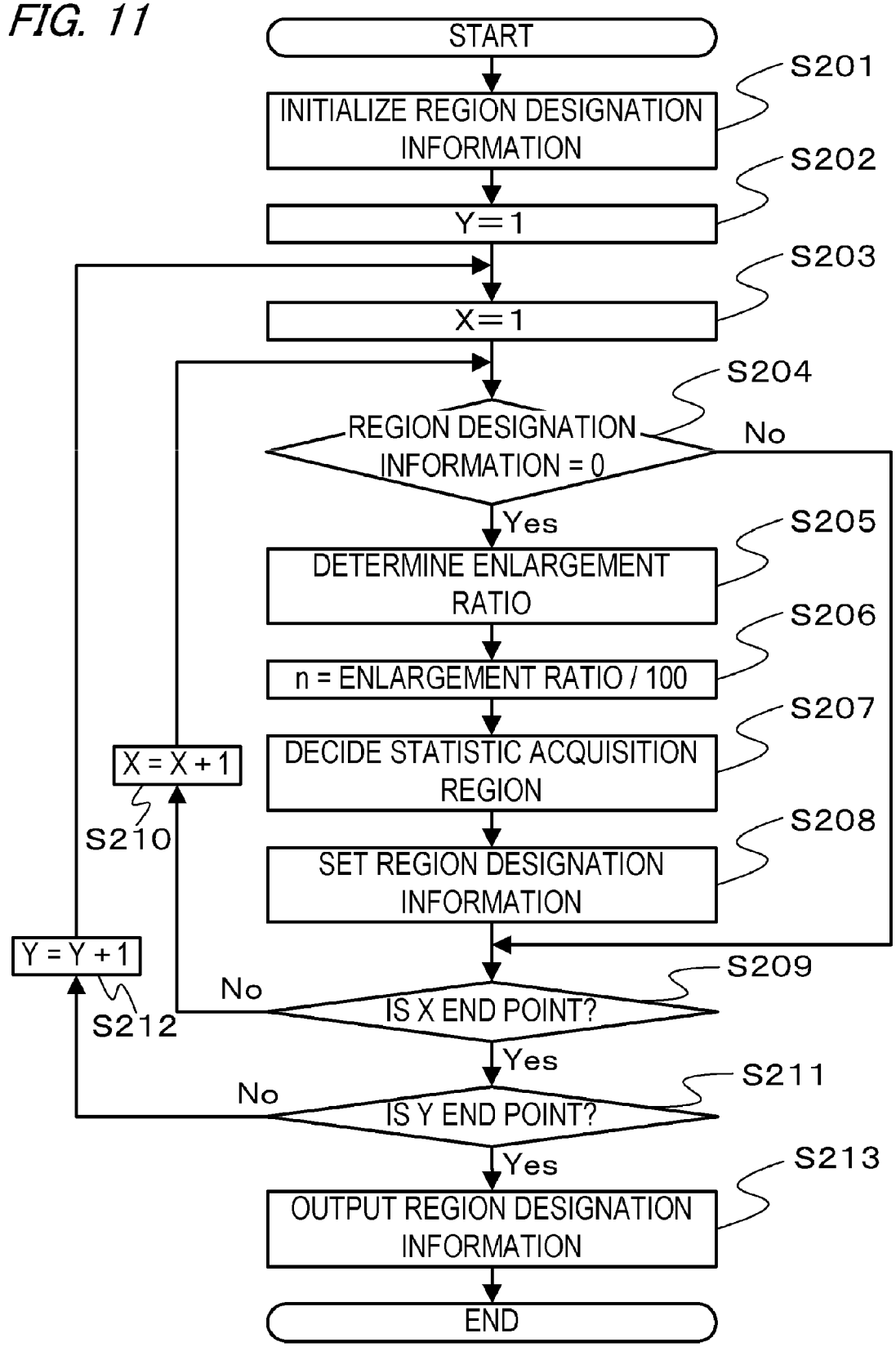
FIG. 11 is a flowchart showing an example of the processing flow of the region designating unit according to Embodiment 2.

FIG. 11 is a flowchart showing the operation of the region designating unit.

When the display region information is input, the region designating unit foremost initializes region designation information of the all divided regions to 0 (step S201).

Subsequently, the region designating unit resets Y to 1 (step S202), and resets X to 1 (step S203).

In addition, the region designating unit reads the region designation information of the divided regions of (X, Y), and determines whether a value other than 0 is set (step S204).

When 0 is set in the region designation information, the processing proceeds to step S205. When a value other than 0 is set in the region designation information, the processing proceeds to step S209.

In step S205, the region designating unit determines the enlargement ratio of the image displayed in the divided regions of (X, Y). Specifically, when the divided regions of (X, Y) are the divided regions including the display region of the enlarged image having an enlargement ratio of 400%, the enlargement ratio is determined as being 400%. Moreover, when the divided regions of (X, Y) are regions that do not include the original image or the enlarged image such as the region of the window of the application, the enlargement ratio is determined as being 100%.

Subsequently, the region designating unit obtains a value n which is obtained by dividing the value (400 in the case of 400%) of the enlargement ratio determined (acquired) in step S205 by 100 (step S206).

In addition, the region designating unit obtains the statistic acquisition region from the obtained value n (step S207). Specifically, the region where the starting point is the current (X, Y) and the end point is (X+n−1, Y+n−1) is determined to be the statistic acquisition region. To put it differently, the plurality of divided regions of X to X+n−1 and Y to Y+n−1 are grouped.

Subsequently, the region designating unit sets the values of the starting point and the end point of the obtained statistic acquisition region as the region designation information of the divided regions included in that region (step S208). In other words, information of the region configured from the grouped divided regions is set as the region designation information of each of the plurality of divided regions. In addition, the processing proceeds to step S209.

For example, when the value of the enlargement ratio of X=2, Y=3 is 400, n=4 is obtained, and the starting point (2, 3) and the endpoint (5, 6) are thereby obtained. In addition, the values of the starting point and the end point are set as the region designation information of the 16 divided regions of X=2 to 5 and Y=3 to 6.

In step S209, the region designating unit determines whether the value of X is the endpoint of the statistic acquisition region. When the value of X is not the end point, the region designating unit adds 1 to X (step S210), and returns to step S5204. When the value of X is the endpoint, the region designating unit determines whether the value of Y is the end point of the statistic acquisition region (step S211). When the value of Y is not the end point, the region designating unit adds 1 to Y (step S212), and returns to step S203. When the value of Y is the end point, the region designating unit outputs the region designation information of each divided region (step S213), and the region designating unit thereby ends the processing.

The region designation information set as described above is input to the statistic detection unit 22 via the communication units 19, 25.

A specific example of the processing of the region designating unit is now explained with reference to FIGS. 12A to 12C.

FIG. 12A shows a display screen example. A region 1201 is the display region of the application window, and a region 1202 is the display region of the image enlarged four times the original image.

Figure 12B:
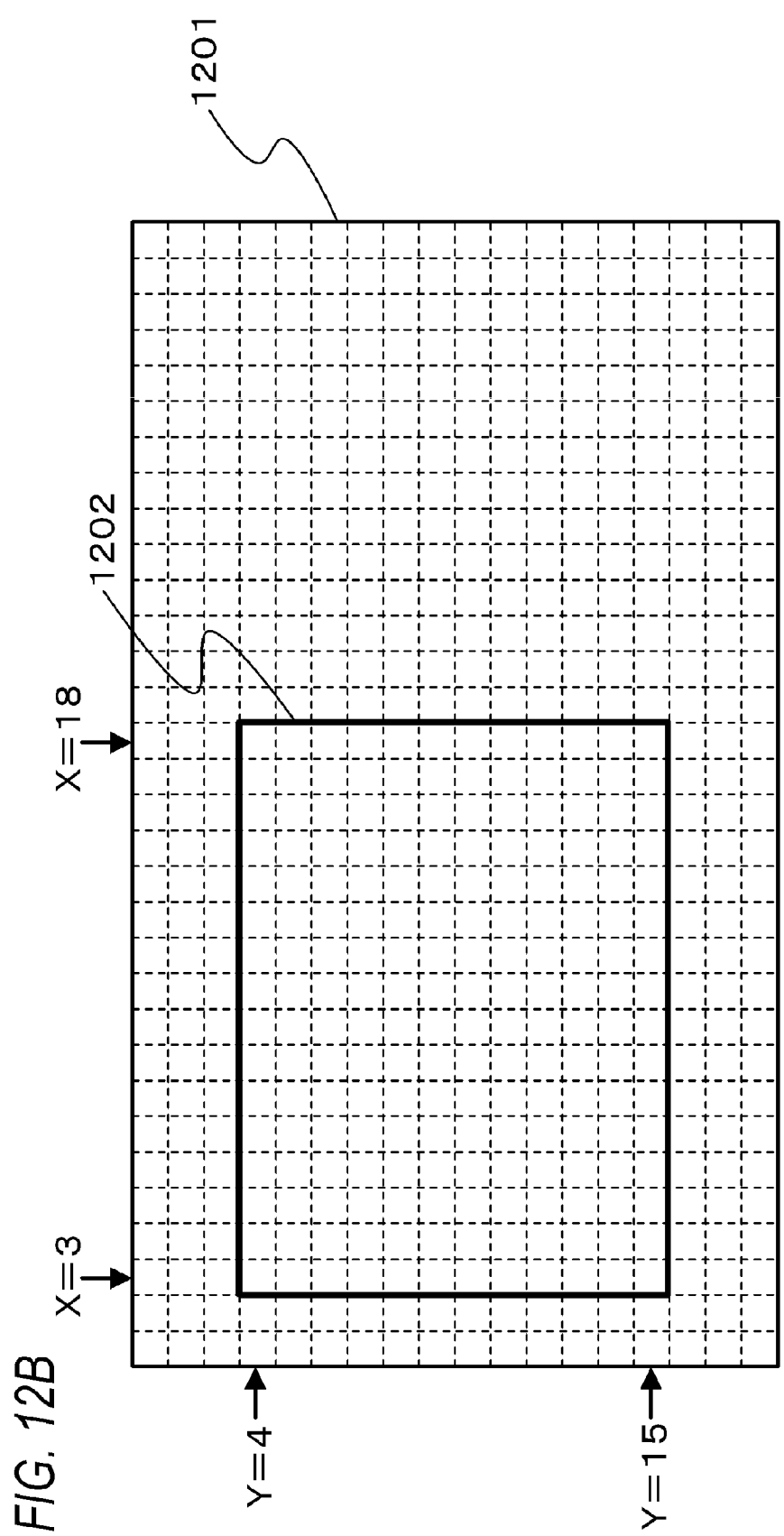

FIG. 12B shows the display region information upon performing the display of FIG. 12A. In the diagram, the broken lines represent the divided regions. In the example of FIG. 12B, information of the regions having a starting point of (3, 4) and an end point of (18, 15) is used as the display region information. In addition, the foregoing information and the enlargement ratio of 400% are associated and input to the region designating unit. The region designating unit determines any region other than the regions represented by the display region information to be a region of the application window or the like. Note that the display region information may include both the information of the region of the image (enlarged image, original image) and the information of the region of the application window.

Figure 12C:
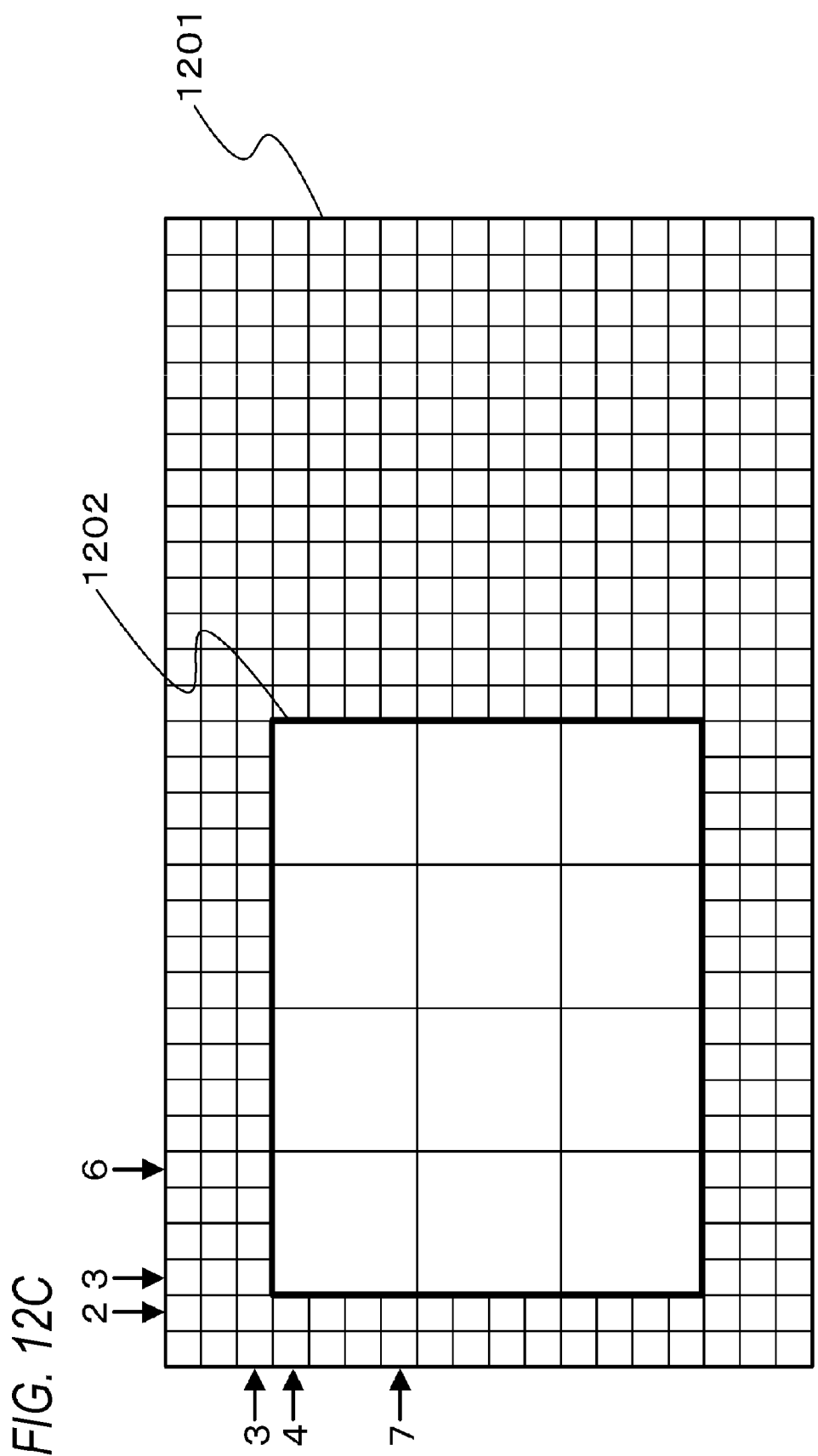

FIG. 12C shows the results upon performing the processing of FIG. 11 by using the foregoing display region information and enlargement ratio. The fine lines of FIG. 12C represent the grouped divided regions.

As shown in FIG. 12C, with the display region of the application window, one divided region is deemed to be one group. In addition, in the display region of an enlarged image having an enlargement ratio of 400%, 4×4=16 divided regions are deemed to be one group.

For example, since the image displayed in the divided regions of X=2, Y=3 is an application window, the value of the enlargement ratio will be "100". Accordingly, the region designation information of X=2, Y=3 will be the starting point of (2, 3) and the end point of (2, 3), and one divided region is deemed to be one group.

Moreover, since the image displayed in the divided regions of X=3, Y=4 is an image having an enlargement ratio of 400%, the value of the enlargement ratio will be "400". Accordingly, the region designation information of X=3, Y=4 will be the starting point of (3, 4) and the end point of (6, 7), and 4×4 divided regions are deemed to be one group. Note that the region designation information of the starting point (3, 4) and the end point (6, 7) is set to the 16 divided regions of X=3 to 6, Y=4 to 7.

The operation of the statistic detection unit 22 is now explained.

The statistic detection unit 22 acquires, for each divided region, the statistics of the image data of the region shown with the region designation information. For example, in the region of the application window, for each divided region, the statistics of the image displayed in that divided region are acquired. When the region designation information shows a region configured from 4×4 divided regions, the statistics of the image displayed in the region configured from such 4×4 divided regions are acquired.

Subsequently, as with Embodiment 1, the image processing unit 23 and the backlight control unit 24 perform processing, for each divided region, by using the statistics that were calculated for that divided region.

As described above, according to this embodiment, upon displaying the second image (enlarged image), the size of the light-emitting unit is changed to a size obtained by enlarging the size of the divided regions based on the enlargement ratio of the second image relative to the first image (original image). Consequently, the difference in contrast between the first image and the second image can be reduced.

Specifically, in the display region of the original image having an enlargement ratio of 100%, for each divided region, that divided region is deemed to be the statistic acquisition region. In addition, in the display region of the enlarged image having an enlargement ratio of 400%, the region that is four times the divided regions is deemed to be the statistic acquisition region.

Since the enlarged image is an image that is obtained by enlarging the original image four times in the horizontal direction and the vertical direction, respectively, the image that was displayed in one divided region during the original image display will be displayed in a region configured from 4×4=16 divided regions during the enlarged image display. Thus, as a result of acquiring the statistics as described above, the statistics can be caused to coincide during the original image display and during the enlarged image display, and the difference in contrast between the original image and the enlarged image can be reduced.

Note that, while example of FIGS. 12A to 12C illustrated a case of causing the edge of the image and the edge of the divided regions to coincide, the edge of the image and the edge of the divided region do not have to coincide.

Figure 13:
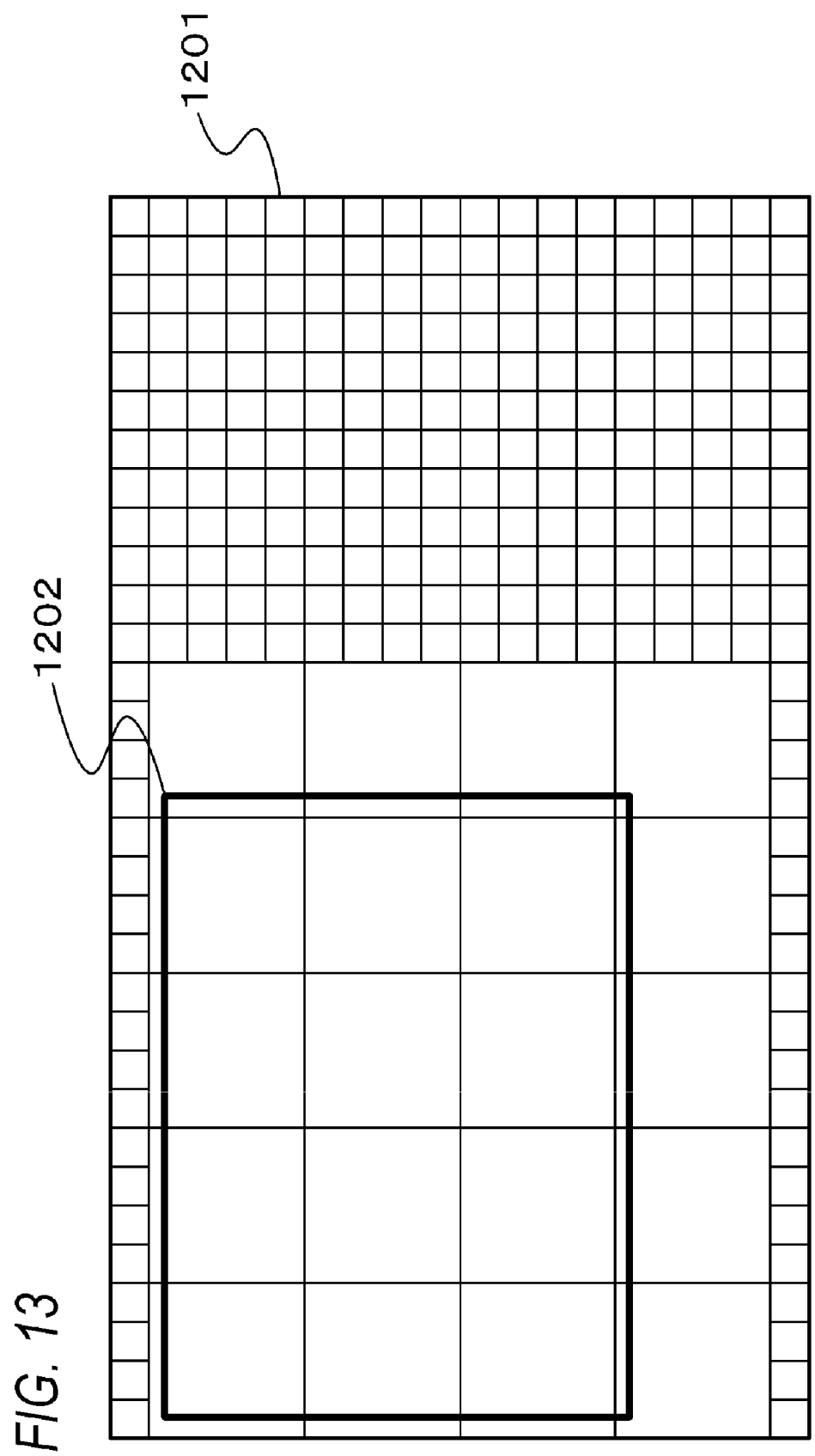
FIG. 13 is a diagram showing an example of the processing performed by the region designating unit according to Embodiment 2.

FIG. 13 shows an example where the edge of the region 1204 of the enlarged image having an enlargement ratio of 400% and the edge of the divided regions do not coincide.

In the foregoing case, it is possible to determine that the enlargement ratio is 400% about the divided regions which contain at least a part of the region 1202 of the enlarged image. Consequently, the divided regions are grouped as shown in FIG. 13.

Note that, while this embodiment explained a case where the first image is an original image having an enlargement ratio of 100%, and the second image is an enlarged image of an enlarged original image, the first and second images are not limited thereto. The first image may also be a reduced image of the original image or an enlarged image of the original image. The second image merely needs to be an enlarged image of the first image. For example, an image having an enlargement ratio of 50% may be used as the first image, and an image having an enlargement ratio of 200% may be used as the second image. In the foregoing case, the value of the enlargement ratio of the divided regions including the display region of the first image can be set to "100", and the value of the enlargement ratio of the divided regions including the display region of the second image can be set to (200/50)×100="400".

Note that, so as long as the display region information and the region designation information are information representing the position and size of the regions (divided region, statistic acquisition region), the display region information and the region designation information do not have to be the information described in this embodiment.

Embodiment 3

The difference in contrast among images having a different enlargement ratio relative to the original image upon performing conventional local dimming tends to be detected by the user when such images are displayed simultaneously. Thus, this embodiment performs processing of enlarging the size of the light-emitting unit when a plurality of images having mutually different enlargement ratios relative to the first image are displayed together. Note that the explanation of the same processing as Embodiments 1 and 2 is omitted.

Foremost, the case of enlarging the size of the light-emitting unit with the method of Embodiment 1 is explained.

When a user operation for displaying a plurality of images having different enlargement ratios is performed, the scaling unit 14 generates data of the plurality of images having different enlargement ratios from the original image according to the user operation, and outputs such data to the synthesizing unit 15. Since the remaining processing is the same as Embodiments 1 and 2, the explanation thereof is omitted.

When a plurality of image data are input from the scaling unit 14, the synthesizing unit 15 synthesizes such image data to generate synthesized image data. For example, synthesized image data in which the plurality of images having different enlargement ratios are disposed in the application window without mutually overlapping is generated and output. Since the remaining processing is the same as Embodiments 1 and 2, the explanation thereof is omitted.

The enlarged image statistic calculation unit 16 performs the calculation processing of the enlarged image statistics for each image only upon simultaneously displaying a plurality of images having mutually different enlargement ratios relative to the first image. Since the processing method is the same Embodiment 1, the explanation thereof is omitted.

As with Embodiment 1, the original image statistic retention unit 17 stores the statistics of the first image for each divided region. Note that the original image statistic retention unit 17 may also store the statistics, for each divided region, of images (for instance, original images of the plurality of displayed images) having different enlargement ratios in comparison to the plurality of displayed images. It is also possible to use the image having the lowest enlargement ratio among the plurality of displayed images as the first image, and store the statistics, for each divided region, of such first image.

The case of enlarging the side of the light-emitting unit with the method of Embodiment 2 is now explained.

The processing of the scaling unit 14 and the synthesizing unit 15 is as described above.

The region designating unit generates the region designation information when a plurality of images having mutually different enlargement ratios relative to the first image are displayed together. Since the method of generating the region designation information is the same as Embodiment 2, the explanation thereof is omitted.

A specific example of the processing of the region designating unit is now explained with reference to FIGS. 14A to 14C.

Figure 14A:
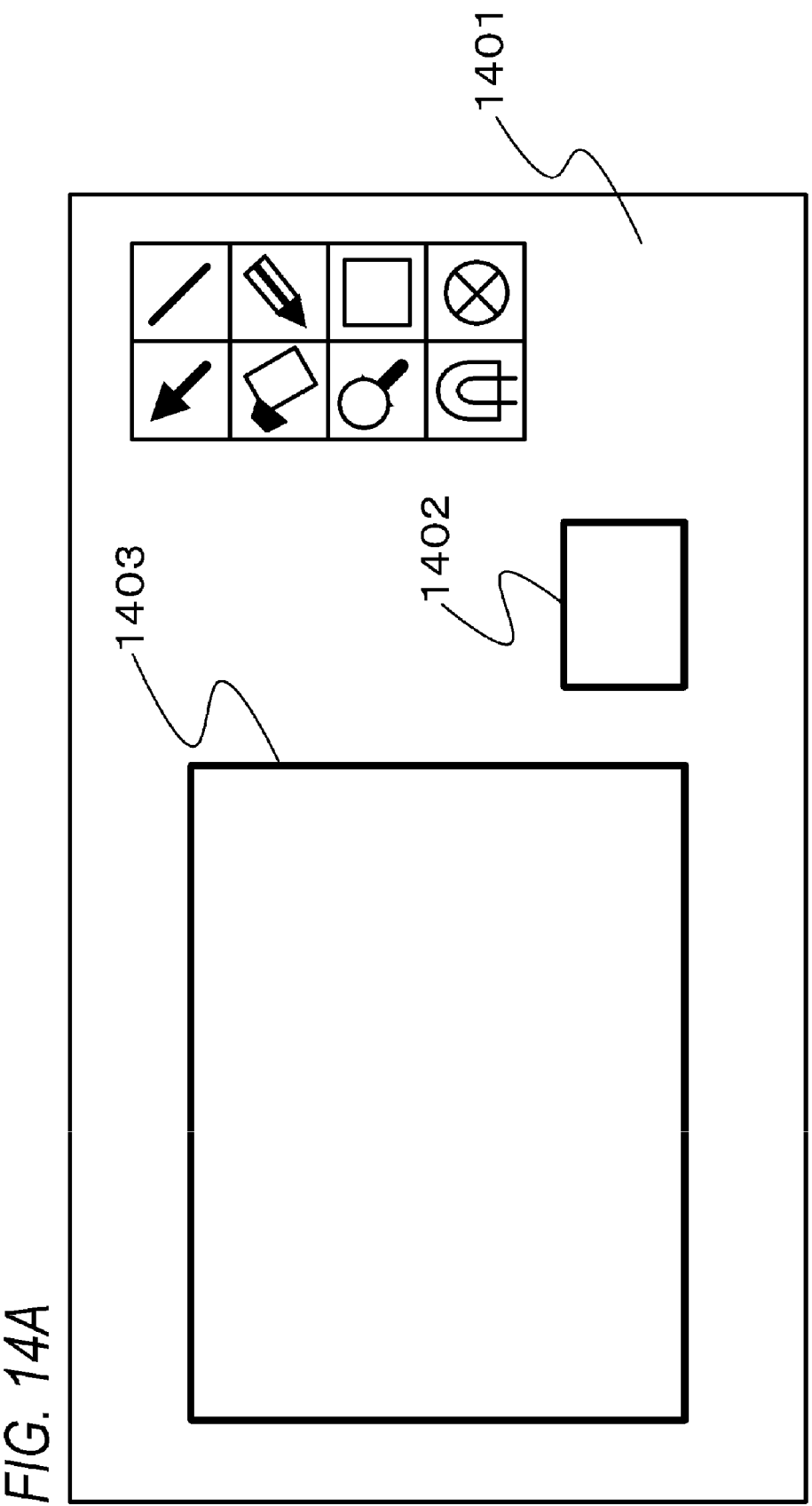
FIGS. 14A to 14C are diagram showing an example of the processing performed by the region designating unit according to Embodiment 3.

FIG. 14A shows a display screen example. A region 1401 is the display region of the application window, a region 1402 is the display region of the original image, and a region 1403 is the display region of the image enlarged four times the original image.

Figure 14B:
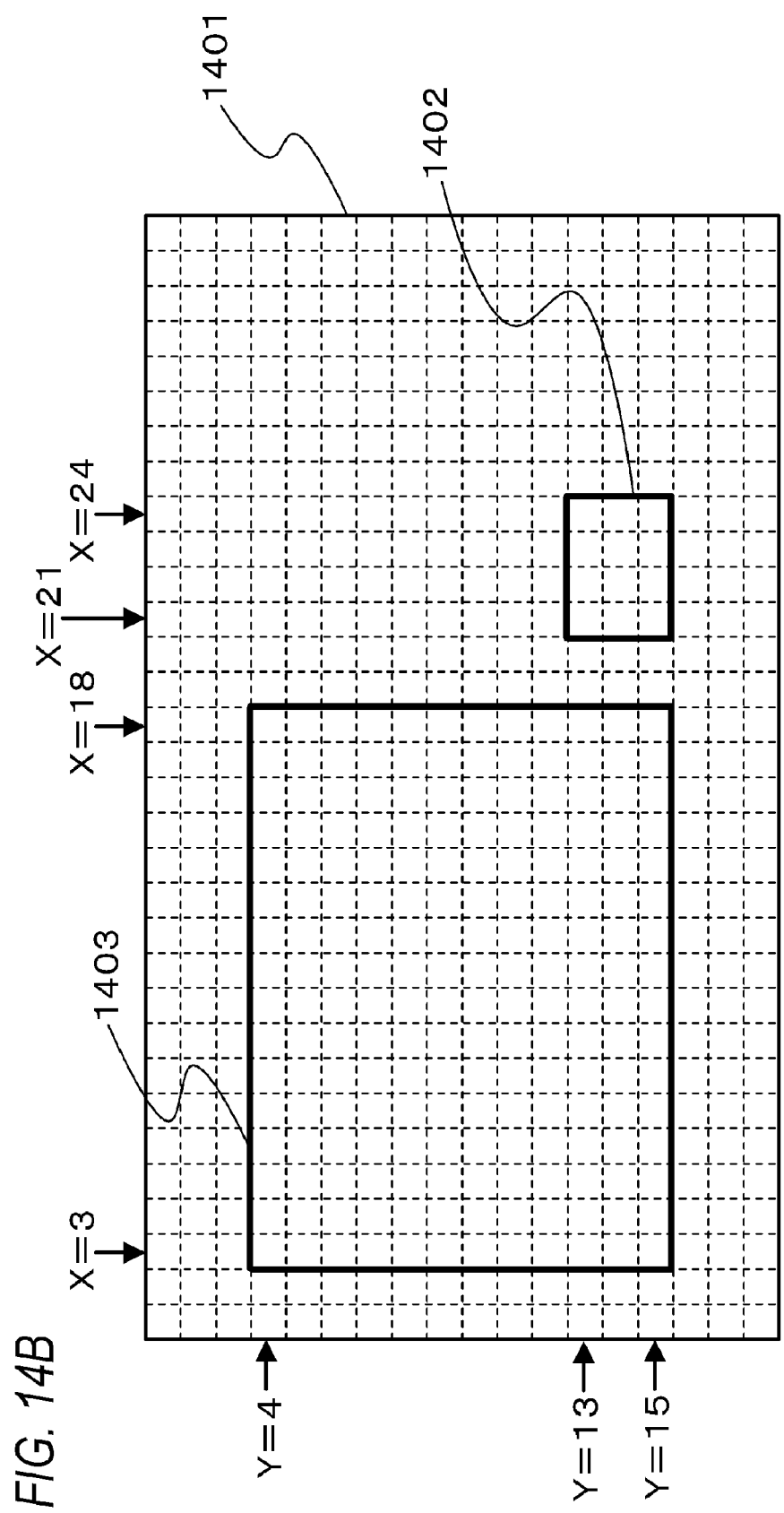

FIG. 14B shows the display region information upon performing the display of FIG. 14A. In the diagram, the broken lines represent the divided regions. In the example of FIG. 14B, information of the regions having a starting point of (21, 13) and an end point of (24, 15) is used as the display region information (first display region information) of the original image. In addition, the foregoing first display region information and the enlargement ratio of 100% are associated and input to the region designating unit. The information of the region of the starting point (3, 4) and the end point (18, 15) is used as the display region information (second display region information) of the enlarged image. In addition, the second display region information and the enlargement ratio of 400% are associated and input to the region designating unit.

Figure 14C:
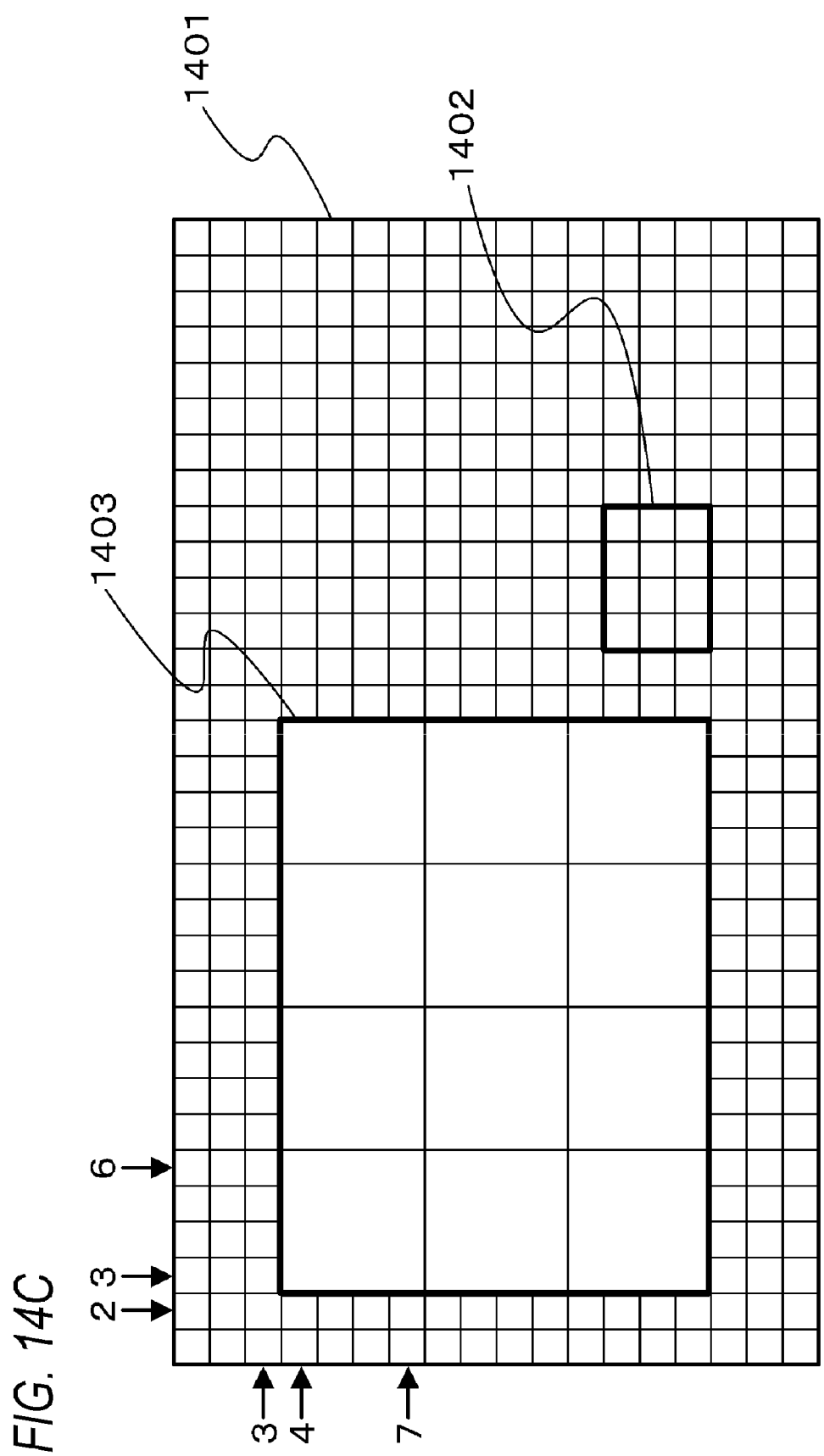

FIG. 14C shows the results upon performing the processing of FIG. 11 by using the foregoing display region information and enlargement ratio. The fine lines of FIG. 14C represent the grouped divided regions.

As shown in FIG. 14C, with the display region of the application window and the region of the original image having an enlargement ratio of 100%, one divided region is deemed to be one group. In addition, in the display region of an enlarged image having an enlargement ratio of 400%, 4×4=16 divided regions are deemed to be one group.

As described above, according to this embodiment, the size of the light-emitting unit is changed upon displaying a plurality of images having different enlargement ratios. Consequently, it becomes difficult of the difference in contrast to be detected by the user, and it is also possible to reduce the processing load of the image output apparatus and the image display apparatus.

Note that, while this embodiment adopted a configuration where one image is input, and a plurality of images having different enlargement ratios are generated from the input one image, the configuration is not limited thereto. It is also possible to adopt a configuration where a plurality of images are input, and a plurality of images having different enlargement ratios are generated from the plurality of input images. In other words, the original image of the plurality of images having different enlargement ratios may be different images, respectively.

Note that, while this embodiment explained a case where a plurality of images are displayed on one screen (one image display apparatus), the plurality of images may be respectively displayed on a plurality of screens (plurality of image display apparatuses). For example, the same processing as the foregoing processing may be performed when the original image is displayed on a first image display apparatus, and the enlarged image is displayed on a second image display apparatus.

Embodiment 4

In this embodiment, the region of the image to be displayed is decided so that the edge of the image and the edge of the divided regions coincide. Since the configuration of the system according to this embodiment is the same as Embodiments 1 to 3, the explanation thereof is omitted. The points that are different from Embodiment 1 to 3 are now explained.

The synthesizing unit 15 according to this embodiment decides (adjusts) the region of the image to be displayed so that the edge of the image and the edge of the divided regions coincide.

Figure 15:
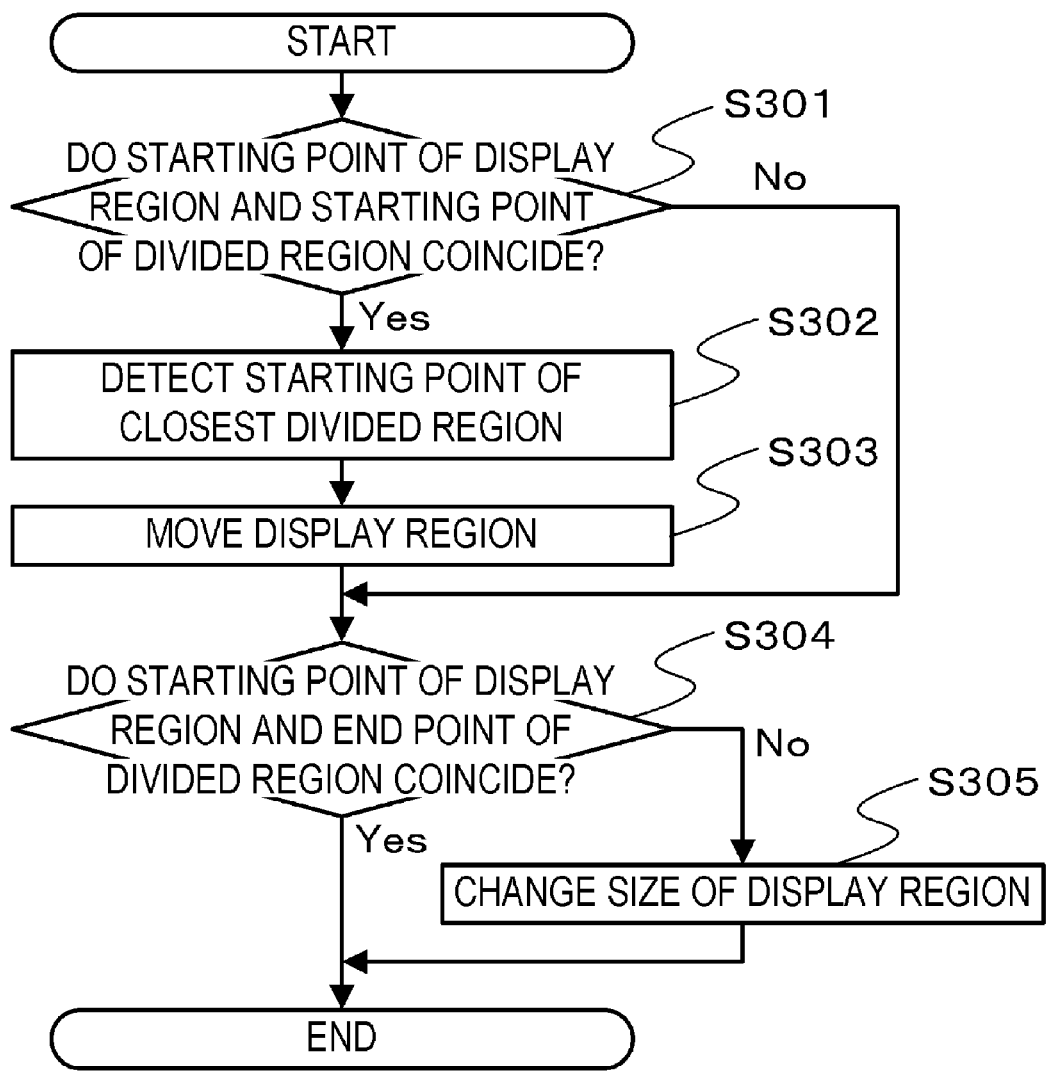
FIG. 15 is a flowchart showing an example of the flow of the display region decision processing according to Embodiment 4.

An example of the processing (display region decision processing) performed by the synthesizing unit 15 for deciding the image display region is now explained with reference to the flowchart of FIG. 15, and FIGS. 16A and 16B. FIGS. 16A and 16B show an example of the display region of the image (first image, second image) before and after adjustment.

Foremost, the synthesizing unit 15 determines whether there is a starting point of the divided region that coincides with the starting point of the current display region (for example, the region designated by the user) of the image (first image, second image) (step S301).

When there is a starting point of the divided region that coincides with the starting point of the current display region of the image, the processing proceeds to step S302. When there is no starting point of the divided region that coincides with the starting point of the current display region of the image, the processing proceeds to step S304.

In step S302, the synthesizing unit 15 detects the divided region containing the starting point that is closest to the starting point of the current display region of the image, and calculates the number of pixels between the foregoing starting points in the horizontal direction and the vertical direction. In the example of FIG. 16A, the divided region of position (2, 2) is detected, and the number of pixels Sx in the horizontal direction and the number of pixels Sy in the vertical direction are calculated.

Subsequently, the synthesizing unit 15 causes the starting point of the display region of the image and the starting point of the divided region to coincide by moving the display region of the image in the number of pixels calculated in step S302 (step S303), and then proceeds to step S304. Consequently, the image display region is changed from the state of FIG. 16A to the state of FIG. 16B.

In step S304, the synthesizing unit 15 determines whether there is an end point (starting point of another divided region) of a divided region that coincides with the end point of the current display region of the image.

When there is an end point of the divided region that coincides with the end point of the current display region of the image, the synthesizing unit 15 ends the processing. When there is no endpoint of the divided region that coincides with the end point of the current display region of the image, the synthesizing unit 15 changes the size (enlargement ratio) of the image so that the end point of the display region of the image coincides with the endpoint of the closest divided region (step S305), and then ends the processing. In the example of FIG. 16B, since the endpoint of the display region of the image and the endpoint of the divided region coincide, the processing is ended.

As described above, according to this embodiment, the region of the image to be displayed is decided so that the edge of the image and the edge of the divided regions coincide. It is thereby possible to only acquire the statistics of the image as the statistics of each divided region, and this will consequently enable the difference in contrast between the first image and the second image to be reduced accurately. Specifically, when the edge of the image and the edge of the divided regions coincide in the first image and the edge of the image and the edge of the divided regions do not coincide in the second image, there are cases where the images displayed in the light-emitting unit will be misaligned between the first image and the second image. According to this embodiment, it is possible to prevent such misalignment of images, and accurately reduce the difference in contrast between the first image and the second image.

Embodiment 5

In this embodiment, a case where the operation mode of the image output apparatus is configured to be selectable from a plurality of modes including a first mode and a second mode is explained. In the first mode, one divided region is set as one light-emitting unit. In other words, the first mode is a mode of causing the image display apparatus to perform local dimming in the initial state. In the second mode, upon displaying the second image, the size of the light-emitting unit is enlarged in comparison to a case of displaying the first image according to the enlargement ratio of the second image relative to the first image. In other words, the second mode is a mode where the image output apparatus performs the processing described in foregoing Embodiments 1 to 4. In the ensuing explanation, let it be assumed that the operation mode can be switched between the first mode and the second mode.

The configuration where a function of performing the foregoing selection is added to the configuration of Embodiment 1 is foremost explained. Note that the explanation of the functions that are the same as Embodiment 1 is omitted.

Figure 17:
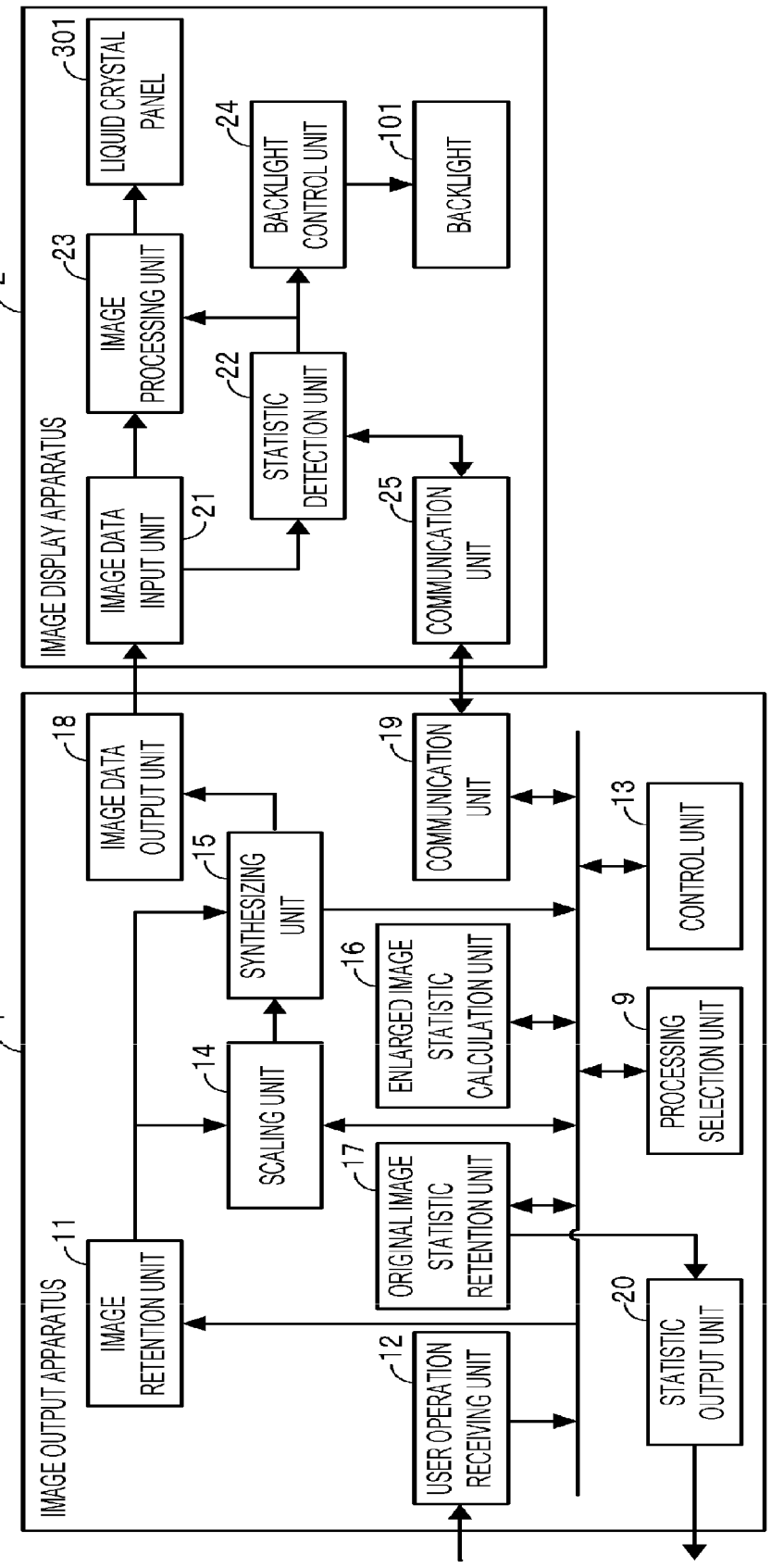
FIG. 17 is a block diagram representing the configuration of the image display system according to Embodiment 5.

FIG. 17 is a block diagram showing an example of the configuration of the system according to this embodiment.

As shown in FIG. 17, the image output apparatus 1 according to this embodiment further has a processing selection unit 9 in addition to the configuration of Embodiment 1 (FIG. 3).

The processing selection unit 9 selects either the first mode or the second mode according to the user operation. Note that the mode to be selected by the processing selection unit 9 in the initial state may be either the first mode or the second mode. In this embodiment, the processing selection unit 9 selects the first mode in the initial state.

When the processing selection unit 9 selects the first mode, the processing selection unit 9 instructs the enlarged image statistic calculation unit 16 not to perform any processing. In the example of FIG. 17, the image display apparatus 2 is operated with one divided region as one light-emitting unit when there is no input of the enlarged image statistics. Thus, as a result of giving the foregoing instructions, it is possible to cause the image display apparatus to perform local dimming in the initial state.

When the processing selection unit 9 selects the second mode, the processing selection unit 9 instructs the enlarged image statistic calculation unit 16 to perform processing. Consequently, as explained in Embodiment 1, upon displaying the second image, the size of the light-emitting unit is enlarged in comparison to the case of displaying the first image.

The configuration of where a function of performing the foregoing selection is added to the configuration of Embodiment 2 is now explained. Note that the explanation of the functions that are the same as Embodiment 2 is omitted.

The system according to this embodiment has a region designating unit in substitute for the enlarged image statistic calculation unit 16 of FIG. 17.

In this embodiment, the enlargement ratio (and display region information) output from the synthesizing unit 15 in Embodiment 2 is input to the processing selection unit 9, and not to the region designating unit.

When the processing selection unit 9 selects the first mode, the processing selection unit 9 changes all input enlargement ratios to 100% and outputs such changed enlargement ratios to the region designating unit. Consequently, the region designating unit generates and outputs the region designation information in which the statistic acquisition region of the respective divided regions as the divided regions. Consequently, one divided region can be deemed to be one light-emitting unit (it is possible to cause the image display apparatus to perform local dimming in the initial state).

When the processing selection unit 9 selects the second mode, the processing selection unit 9 outputs the input enlargement ratio as is to the region designating unit. Consequently, as explained in Embodiment 2, upon displaying the second image, the size of the light-emitting unit is enlarged in comparison to the case of displaying the first image.

As described above, according to this embodiment, it is possible to switch the operation mode of the image output apparatus between a plurality of modes including a first mode and a second mode. As a result of operating the image output apparatus in the second mode, as explained in Embodiments 1 to 4, the difference in contrast between the first image and the second image can be reduced. Moreover, as a result of operating the image output apparatus in the first mode, since local dimming is performed with one divided region as one light-emitting unit; that is, by minimizing the size of the light-emitting unit, the contrast can be improved considerably. Accordingly, the user can freely select to considerably improve the contrast of the image or display the images in the same contrast regardless of the enlargement ratio.

Note that, while this embodiment explained a case of selecting the operation mode according to the user operation, the selection method is not limited thereto.

The operation mode may also be selected according to the number of images to be displayed. For example, the first mode may be selected upon displaying one image, and the second mode may be selected upon displaying a plurality of images.

The operation mode may also be selected according to the enlargement ratio of the image to be displayed. For example, the first mode may be selected upon displaying an image having an enlargement ratio of a predetermined value (for instance, 400%) or higher.

The operation mode may also be selected according to the difference in the enlargement ratios among the plurality of images to be displayed. For example, the second mode may be selected when the difference in the enlargement ratios among the plurality of images to be displayed is a predetermined value (for instance, 200%) or higher, and the first mode may be selected when the difference in the enlargement ratios is less than the foregoing predetermined value.

Note that, while this embodiment explained a case of switching the operation mode between the first and second modes, the operation mode may also include a third mode (the operation mode may be switchable to the third mode). The third mode is, for example, a mode which causes the image display apparatus 2 to refrain from performing local dimming.

Note that the processing of the processing selection unit 9 is not limited to the foregoing processing.

For example, adopted may be a configuration where the enlarged image statistics from the enlarged image statistic calculation unit 16 are input to the processing selection unit 9. In the foregoing case, in the first mode, the processing selection unit 9 needs not to output the input enlarged image statistics. In the second mode, the processing selection unit 9 may output the input enlarged image statistics to the image display apparatus 2 (via the communication unit 19).

Moreover, adopted may be a configuration where the region designation information from the region designating unit is input to the processing selection unit 9. In the foregoing case, in the first mode, the processing selection unit 9 may output the pre-stored region designation information (region designation information in which the statistic acquisition region of each divided region is used as the divided region) to the image display apparatus 2. In the second mode, the processing selection unit 9 may output the input region designation information to the image display apparatus 2.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2011-158047, filed on Jul. 19, 2011, which is hereby incorporated by reference herein in its entirety.

What is claimed is:

1. A control apparatus for controlling a display apparatus having a backlight of which emission brightness is controlled for each of a plurality of blocks of a screen, and a display panel which displays an image on the screen by transmitting light from the backlight, wherein each of the plurality of blocks corresponds to a plurality of pixels being backlit with light of a common brightness, the control apparatus comprising:
a control unit that sets, in a case of displaying a first image, a plurality of first blocks, and sets, in a case of displaying a second image formed by enlarging the first image, according to an enlargement ratio of the second image relative to the first image, a plurality of second blocks of which a size is larger than a size of the first blocks, wherein an enlargement ratio of a second block relative to a first block is an enlargement ratio that is substantially equal to the enlargement ratio of the second image relative to the first image, and wherein in a case of displaying the first image, a size of each of the plurality of first blocks corresponds to a minimum controllable size for the backlight, and in a case of displaying the second image, the size of each of the plurality of second blocks is greater than the size of each of the plurality of first blocks by a factor of the enlargement ratio of the second block relative to the first block, and wherein
in a case of displaying the first image, the backlight emits, for each of the plurality of first blocks, light with brightness according to brightness of each portion of the first image to be displayed in each first block, and
in a case of displaying the second image, the backlight emits, for each of the plurality of second blocks, light with brightness according to brightness of that portion of the first image which was previously displayed in each first block whose position in the first image corresponds to position of each second block in the second image.

2. The control apparatus according to claim 1, wherein
the plurality of first blocks correspond to a plurality of divided regions constituting a region of the screen,
the display apparatus further comprises a decision unit that decides, for each of the plurality of first block, emission brightness of the backlight, by using statistics of an image to be displayed in a divided region corresponding to that first block,
the control apparatus further comprises a storage unit that stores, for each of the plurality of first blocks corresponding to divided regions in which the first image is displayed, the statistics of that first block in a case of displaying the first image, and
in a case of displaying the second image, the control unit instructs the display apparatus so that the decision unit uses, for each of the plurality of second blocks corresponding to regions of the screen in which the second image is displayed, the statistics of a first block, which are stored in the storage unit, corresponding to that second block as the statistics of first blocks corresponding to divided regions included in a region of the screen corresponding to that second block.

3. The control apparatus according to claim 1, wherein
the plurality of first blocks correspond to a plurality of divided regions constituting a region of the screen,
the display apparatus further comprises:
an acquisition unit that acquires, for each of the plurality of divided regions, statistics of an image to be displayed in that divided region; and
a decision unit that decides, for each of the plurality of first blocks, emission brightness of the backlight by using the statistics of a divided region corresponding to that first block acquired by the acquisition unit, and
in a case of displaying the second image, the control unit instructs the display apparatus so that the acquisition unit acquires, for each of the plurality of second blocks, statistics of the second image to be displayed in a region of the screen corresponding to that second block as the statistics of divided regions included in the region of the screen corresponding to that second block.

4. The control apparatus according to claim 1, wherein the control apparatus further comprises a region decision unit that decides a display region of an image so that each edge of the display region coincides to an edge of any of regions of the screen corresponding to the blocks set as the plurality of first blocks or the plurality of second blocks.

5. The control apparatus according to claim 1, wherein
the control apparatus further comprises a selection unit that selects a first mode or a second mode according to a user operation; and
the control unit sets, in a case where the first mode is selected by the selection unit, the plurality of blocks, which are set as the plurality of first blocks, corresponding to a plurality of divided regions constituting a region of the screen; and
sets, in a case where the second mode is selected by the selection unit and the second image is displayed, the size of the second block larger than the first block.

6. A control method for a control apparatus for controlling a display apparatus having a backlight of which emission brightness is controlled for each of a plurality of blocks of a screen, and a display panel which displays an image on the screen by transmitting light from the backlight, wherein each of the plurality of blocks corresponds to a plurality of pixels being backlit with light of a common brightness,
the method comprising:
a step of controlling to set, in a case of displaying a first image, a plurality of first blocks, and sets, in a case of displaying a second image formed by enlarging the first image, according to an enlargement ratio of the second image relative to the first image, a plurality of second blocks of which a size is larger than a size of the first blocks, wherein an enlargement ratio of a second block relative to a first block is an enlargement ratio that is equal to the enlargement ratio of the second image relative to the first image, and wherein in a case of displaying the first image, a size of each of the plurality of first blocks corresponds to a minimum controllable size for the backlight, and in a case of displaying the second image, the size of each of the plurality of second blocks is greater than the size of each of the plurality of first blocks by a factor of the enlargement ratio of the second block relative to the first block, and wherein in a case of displaying the first image, the backlight emits, for each of the plurality of first blocks, light with brightness according to brightness of each portion of the first image to be displayed in each first block, and in a case of displaying the second image, the backlight emits, for each of the plurality of second blocks, light with brightness according to brightness of that portion of the first image which was previously displayed in each first block whose position in the first image corresponds to position of each second block in the second image.

7. The control method for a control apparatus according to claim 6, wherein the plurality of first blocks correspond to a plurality of divided regions constituting a region of the screen, the display apparatus further comprises a decision unit that decides, for each of the plurality of first blocks, emission brightness of the backlight by using statistics of an image to be displayed in a divided region corresponding to that first block, the control method for a control apparatus further comprises a step of storing, for each of the plurality of first blocks corresponding to divided regions in which the first image is displayed, the statistics of that first block in a case of displaying the first image, and in the controlling to set step, in a case of displaying the second image, a command is issued to the display apparatus so that the decision unit uses, for each of the plurality of second blocks corresponding to regions of the screen in which the second image is displayed, the statistics of a first block, which are stored in the storage step, corresponding to that second block as the statistics of first blocks corresponding to divided regions included in a region of the screen corresponding to that second block.

8. The control method for a control apparatus according to claim 6, wherein the plurality of first blocks correspond to a plurality of divided regions constituting a region of the screen, the display apparatus further comprises:

an acquisition unit that acquires, for each of the plurality of divided regions, statistics of an image to be displayed in that divided region; and a decision unit that decides, for each of the plurality of first blocks, emission brightness of the backlight by using the statistics of a divided region corresponding to that first block acquired by the acquisition unit, wherein in the controlling to set step, in a case of displaying the second image, a command is issued to the display apparatus so that the acquisition unit acquires, for each of the plurality of second blocks, statistics of the second image to be displayed in a region of the screen corresponding to that second block as the statistics of divided regions included in the region of the screen corresponding to that second block.

9. The control method for a control apparatus according to claim 6, further comprising:

a step of deciding a display region of an image so that each edge of the display region coincides to an edge of any of regions of the screen corresponding to the blocks set as the plurality of first blocks or the plurality of second blocks.

10. The control method for a control apparatus according to claim 6, further comprising a step of selecting a first mode or a second mode according to an user operation; and in the controlling to set step, in a case where the first mode is selected by the selecting step, the plurality of blocks, which are set as the plurality of first blocks, corresponding to a plurality of divided regions constituting a region of the screen are set; and in a case where the second mode is selected by the selecting step and the second image is displayed, the size of the second block larger than the first block is set.

\* \* \* \* \*